United States Patent
Aoki et al.

(10) Patent No.: US 11,899,834 B2
(45) Date of Patent: Feb. 13, 2024

(54) INFORMATION PROCESSING DEVICE AND METHOD

(71) Applicant: SONY GROUP CORPORATION, Tokyo (JP)

(72) Inventors: Yu Aoki, Tokyo (JP); Kentaro Ida, Tokyo (JP); Yuri Kusakabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,526

(22) PCT Filed: Dec. 14, 2020

(86) PCT No.: PCT/JP2020/046590
§ 371 (c)(1),
(2) Date: Jun. 16, 2022

(87) PCT Pub. No.: WO2021/131862
PCT Pub. Date: Jul. 1, 2021

(65) Prior Publication Data
US 2023/0005098 A1  Jan. 5, 2023

(30) Foreign Application Priority Data
Dec. 27, 2019 (JP) .................................. 2019-239565

(51) Int. Cl.
*G06F 3/01* (2006.01)
*G06F 3/038* (2013.01)
(Continued)

(52) U.S. Cl.
CPC .............. *G06F 3/011* (2013.01); *G06F 3/013* (2013.01); *G06F 3/038* (2013.01); *G06T 3/005* (2013.01);
(Continued)

(58) Field of Classification Search
None
See application file for complete search history.

(56) References Cited

U.S. PATENT DOCUMENTS 5,742,290 A * 4/1998 Hayano .................. G06T 17/20
434/283
2011/0279456 A1* 11/2011 Hiranuma .............. G03B 21/28
345/428
(Continued)

FOREIGN PATENT DOCUMENTS

JP   2000-163179 A   6/2000
JP   2011-054069 A   3/2011
(Continued)

OTHER PUBLICATIONS

International Search Report and Written Opinion of PCT Application No. PCT/JP2020/046590, dated Jan. 19, 2021, 10 pages of ISRWO.

*Primary Examiner* — Jwalant Amin
(74) *Attorney, Agent, or Firm* — CHIP LAW GROUP

(57) ABSTRACT

An information processing device according to an embodiment includes a control unit that performs: control of switching a display coordinate system of display content from a first display coordinate system to a second display coordinate system, the display content displayed on a surface of a real object by a display unit, depending on a state of an input operation of changing a position or an angle of the display content; and control of changing a display position or a display angle of the display content in accordance with the second display coordinate system and causing the display unit to display input assist display corresponding to axes of the second display coordinate system in a case where the display coordinate system is switched from the first display coordinate system to the second display coordinate system.

20 Claims, 23 Drawing Sheets

(51) Int. Cl.
*G06T 3/00* (2006.01)
*G09G 3/00* (2006.01)

(52) U.S. Cl.
CPC ..... *G09G 3/002* (2013.01); *G09G 2340/0464* (2013.01); *G09G 2354/00* (2013.01)

(56) References Cited

U.S. PATENT DOCUMENTS

| | | | |
|---|---|---|---|
| 2014/0368456 A1* | 12/2014 | Sakai | G06F 3/0488 345/173 |
| 2019/0050609 A1* | 2/2019 | Moriyama | G06K 7/10881 |
| 2019/0122638 A1* | 4/2019 | Anderson | G09G 5/003 |
| 2019/0258369 A1* | 8/2019 | Suzuki | H04N 21/4131 |
| 2021/0144359 A1* | 5/2021 | Kurata | H04N 13/383 |
| 2022/0014867 A1* | 1/2022 | Zhao | H04R 1/028 |

FOREIGN PATENT DOCUMENTS

| | | |
|---|---|---|
| JP | 2013-106253 A | 5/2013 |
| JP | 2014-044735 A | 3/2014 |
| JP | 2015-115682 A | 6/2015 |

* cited by examiner

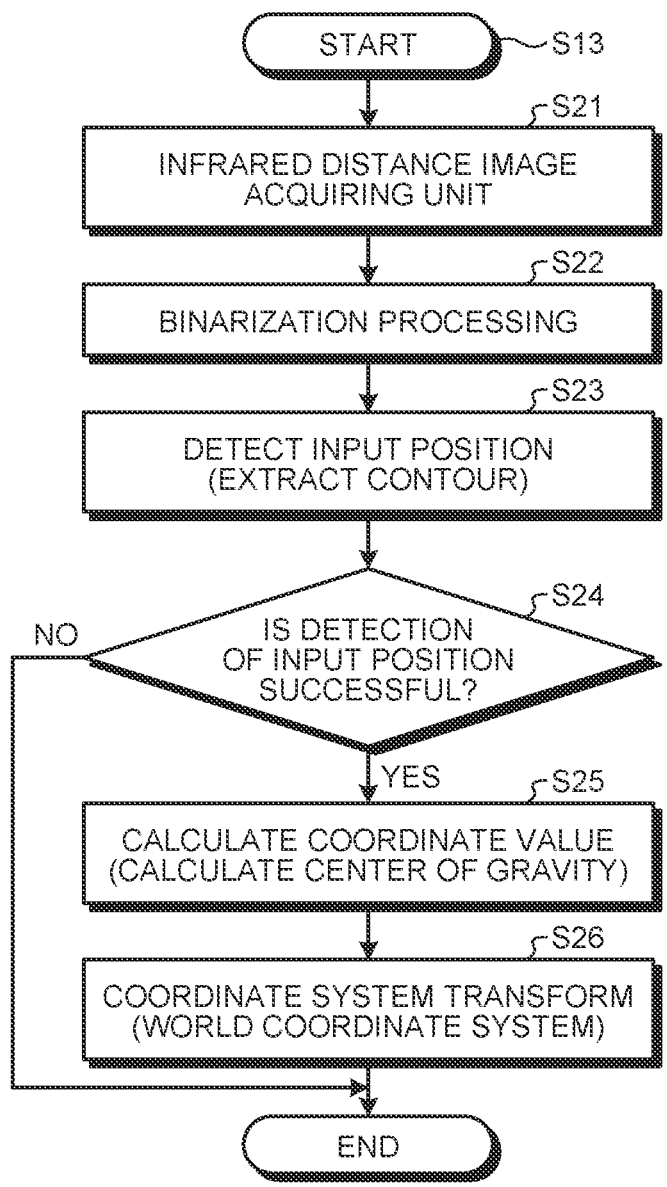

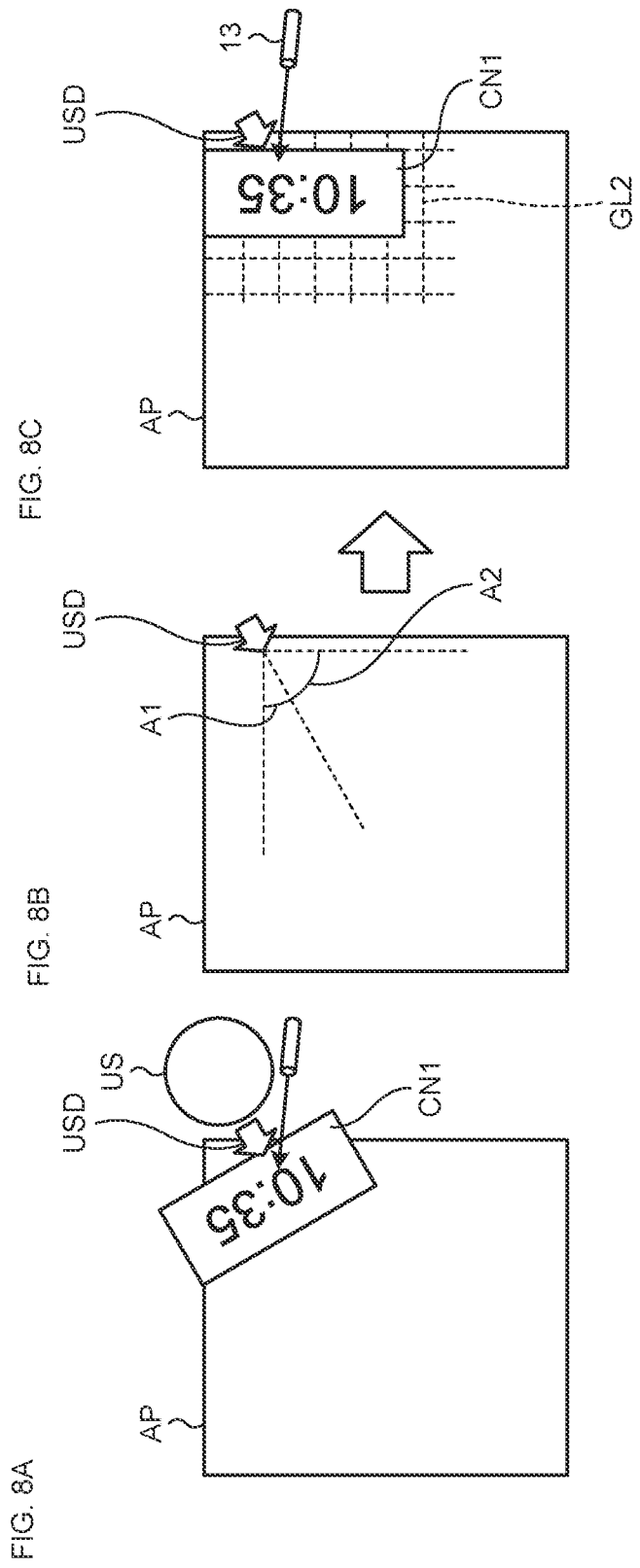

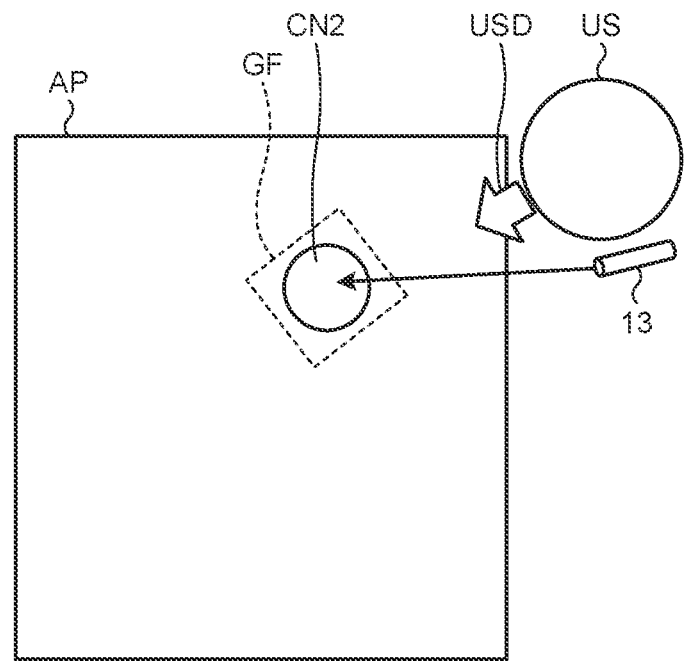

FIG. 12A
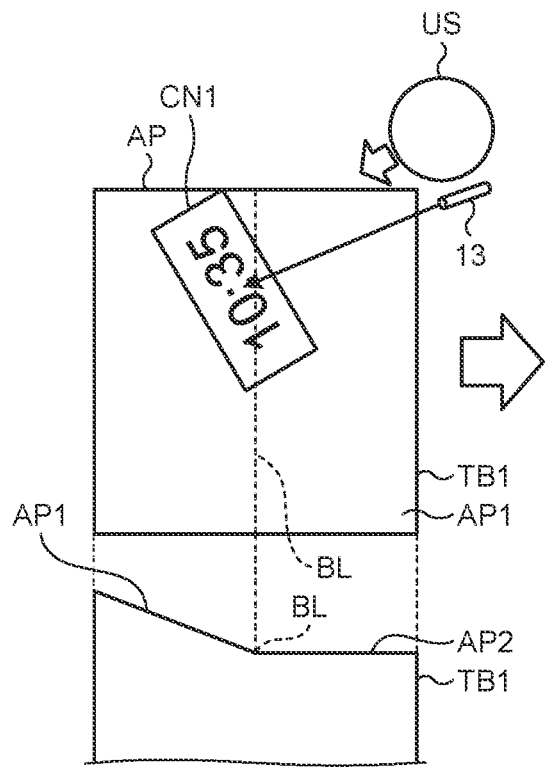
FIG. 12C
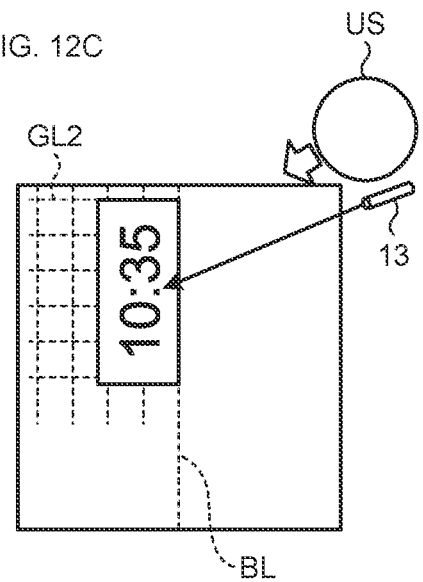
FIG. 12B
FIG. 13A
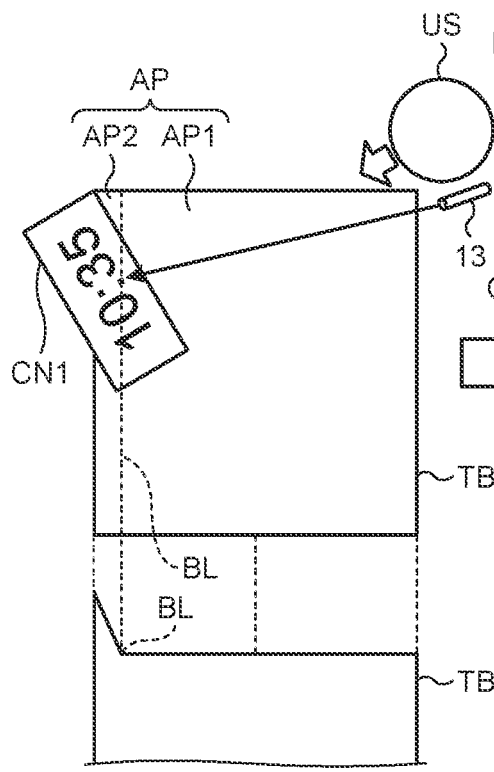
FIG. 13C
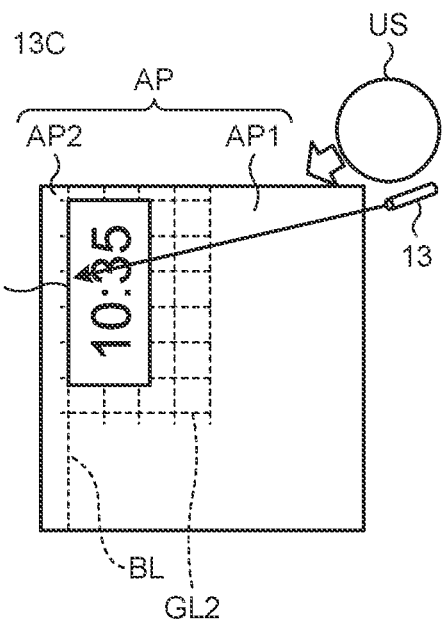
FIG. 13B (AT TIME OF DIRECT INPUT)

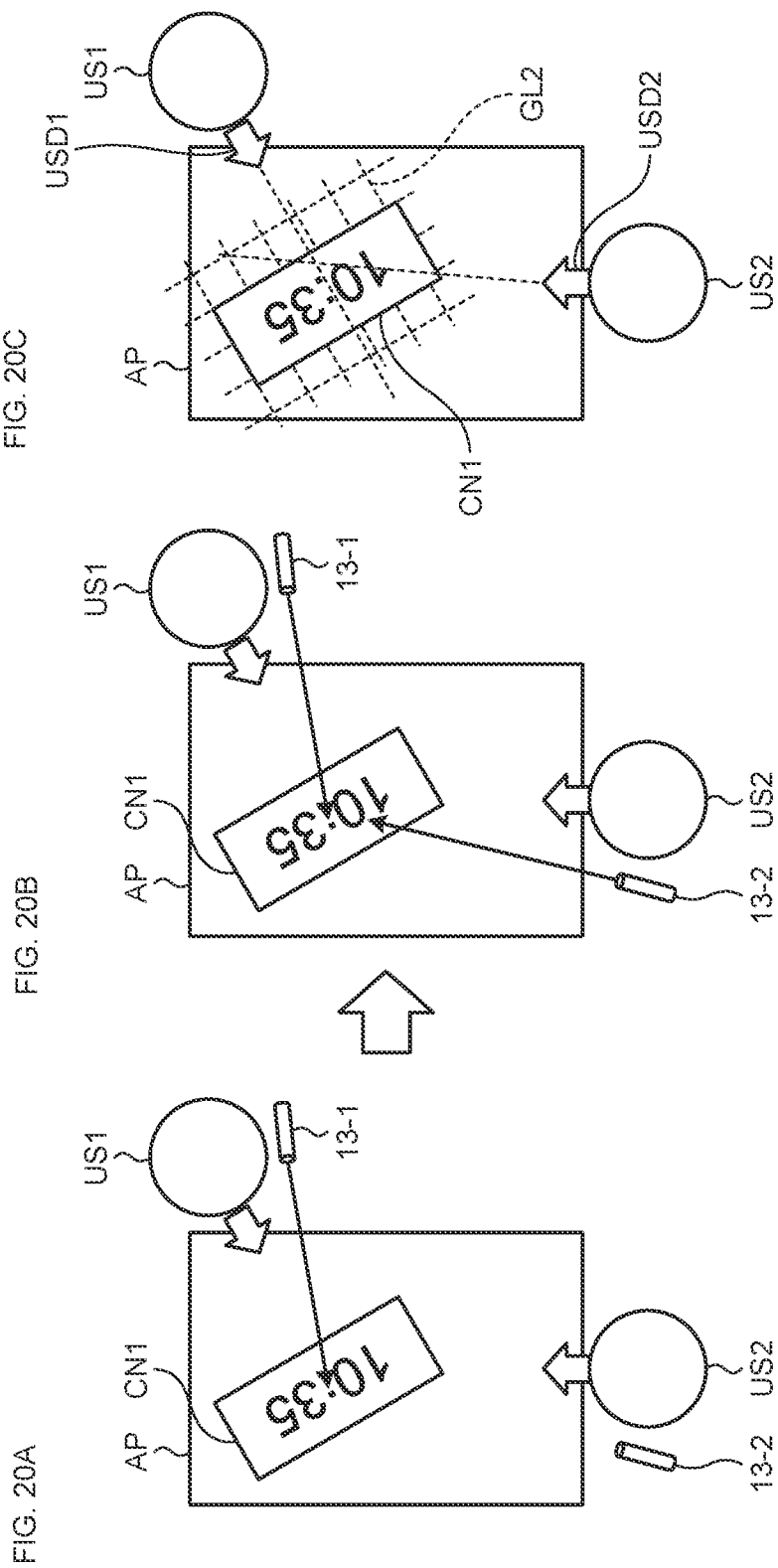

INFORMATION PROCESSING DEVICE AND METHOD

CROSS REFERENCE TO RELATED APPLICATIONS

This application is a U.S. National Phase of International Patent Application No. PCT/JP2020/046590 filed on Dec. 14, 2020, which claims priority benefit of Japanese Patent Application No. JP 2019-239565 filed in the Japan Patent Office on Dec. 27, 2019. Each of the above-referenced applications is hereby incorporated herein by reference in its entirety.

FIELD

The present disclosure relates to an information processing device, a method, and a program.

BACKGROUND

In devices used in a fixed installation environment in which a GUI is adopted, such as computers, generally, the operation of selecting a function using a pointing device such as a mouse is performed. Meanwhile, in systems that input or operation is performed on display content projected by a projector, instruction input devices such as a laser pointer that can remotely perform instruction operation or a pen that can directly perform writing operation on a projection plane is used. Furthermore, in a case where a video or the like is projected using a projector, a wall surface or a screen perpendicular to the ground, such as a home theater, is used.

CITATION LIST

Patent Literature

Patent Literature 1: JP 2015-115682 A

SUMMARY

Technical Problem

In recent years, use of a horizontal plane such as a table or a floor by an ultra short throw projector and use of a desirable position in an installation space by a projector capable of dynamically changing the projection direction have become possible. In particular, in a case where a user performs an input operation related to an object present in a real space on a projection plane, there is a problem that it is difficult to perform an input operation matching display content unless the arrangement and the shape of the display content (object), the orientation of projection content, and the orientation of a user who operates are matched.

The present disclosure has been made in view of such circumstances, and an object of the present disclosure is to facilitate a pointing input operation in a real space in which there is no operation reference by matching the pointing input operation with the real space.

Solution to Problem

In order to solve the above problem, an information processing device according to the present disclosure includes: a control unit that performs: control of switching a display coordinate system of display content from a first display coordinate system to a second display coordinate system, the display content displayed on a surface of a real object by a display unit, depending on a state of an input operation of changing a position or an angle of the display content; and control of changing a display position or a display angle of the display content in accordance with the second display coordinate system and causing the display unit to display input assist display corresponding to axes of the second display coordinate system in a case where the display coordinate system is switched from the first display coordinate system to the second display coordinate system.

According to an embodiment, in a case where a display coordinate system is switched from a first display coordinate system to a second display coordinate system, a control unit changes a display position or a display angle of display content in accordance with the second display coordinate system and causes the display unit to display input assist display corresponding to axes of the second display coordinate system. Therefore, it is possible to display the input assist display corresponding to the second display coordinate system serving as an operation reference in a real space where there is no operation reference and to facilitate the pointing input operation in the real space, where there is no operation reference, in a manner that matches the real space.

BRIEF DESCRIPTION OF DRAWINGS

FIG. 6 is an estimation processing flowchart of an input direction of a user US.

FIGS. 8A, 8B, and 8C are explanatory diagrams of input position correcting processing.

FIG. 11 is an explanatory diagram of input assist display according to a third other aspect.

FIGS. 12A, 12B, and 12C are explanatory diagrams of input assist display and an input assist operation according to a fourth aspect.

FIGS. 13A, 13B, and 13C are explanatory diagrams of input assist display and an input assist operation according to a fifth aspect.

FIGS. 20A, 20B, and 20C are explanatory diagrams of another state in a case where the same content is operated by a plurality of persons.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

[1] First Embodiment

First, a content display system according to a first embodiment will be described.

Figure 1:
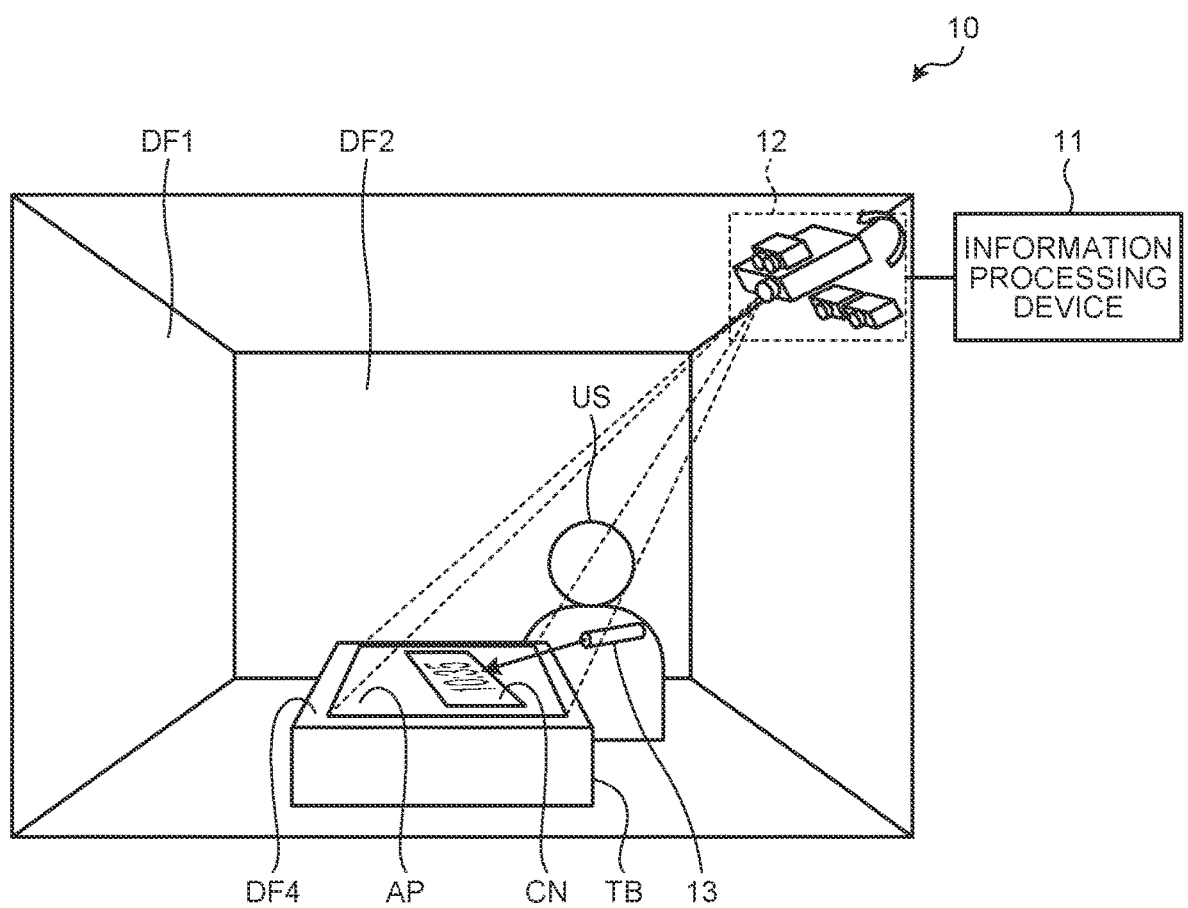
FIG. 1 is a schematic configuration explanatory diagram of a content display system.

FIG. 1 is a schematic configuration explanatory diagram of a content display system.

In the following description, it is based on the premise that display content includes all objects to be operated by a user on a display screen such as graphics, a handwritten characters, or the like directly input by the user in addition to a display screen of text, a photograph, a moving image, computer graphics, a website, or the like and a combination of one or a plurality of these.

In addition, the position of display content includes the concept of the position of the display content on a display screen and, as necessary, the position of the display screen of the display content.

Furthermore, the angle of display content refers to an angle when the display content is rotated on a virtual plane containing the display screen with any position on the display screen as a rotation center.

The content display system 10 of the first embodiment includes an information processing device 11 that performs content display control on the basis of a state of a user US such as the posture and an instruction of the user US, a content projection unit 12 that projects and displays desired content CN on a desired projector projection area AP under the control of the information processing device 11, and an instruction input device 13 used to give an instruction on an input position in the projector projection area AP.

In the above configuration, the instruction input device 13 is configured as a pointing device or the like and is used to give an instruction on the input position and the input direction on the content projection plane by emitting infrared light. The light output by the instruction input device 13 may be visible light or invisible light other than infrared light.

Figure 2:
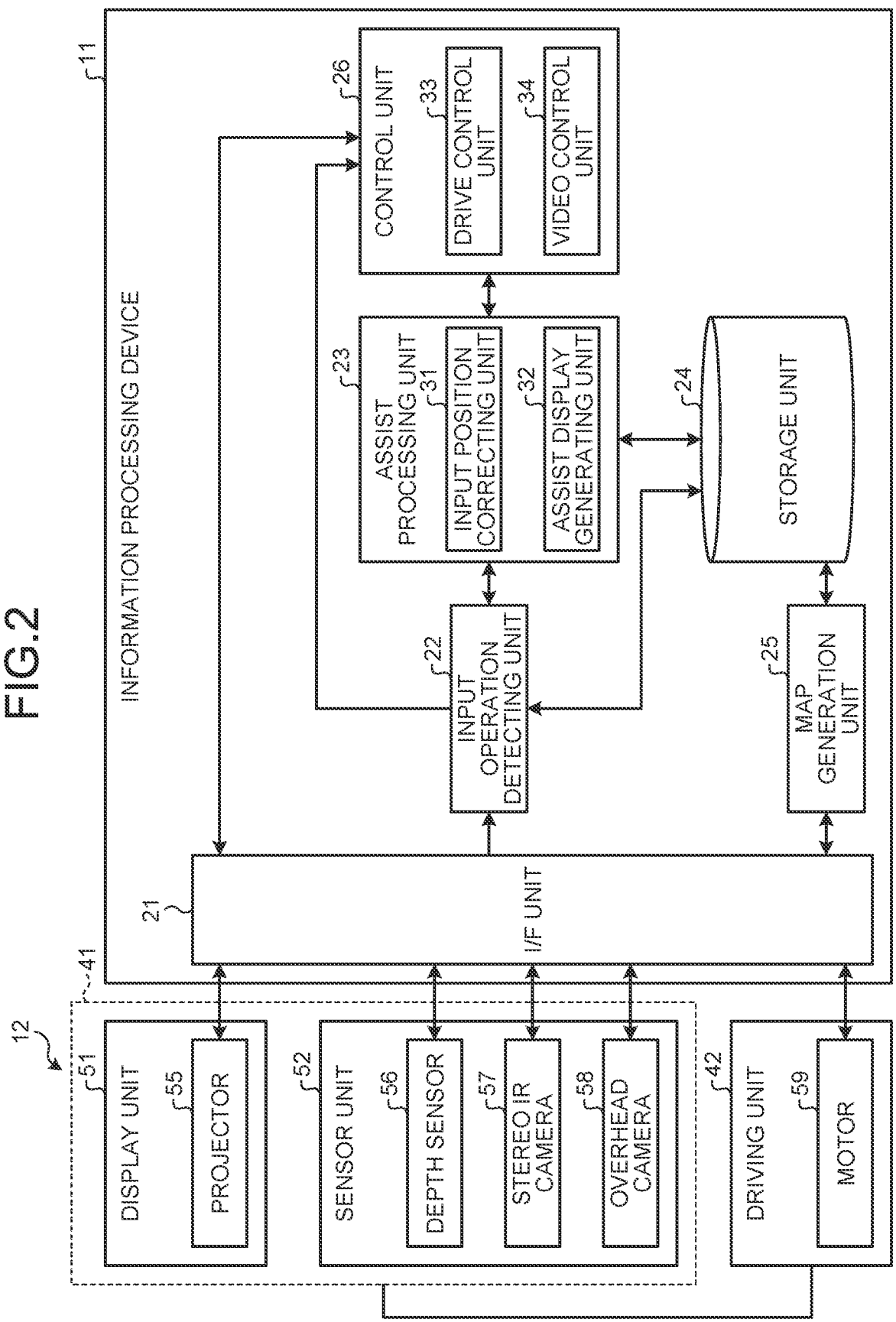
FIG. 2 is a block diagram illustrating a detailed configuration of a content display system according to a first embodiment.

FIG. 2 is a detailed configuration block diagram of the content display system according to the first embodiment.

The information processing device 11 includes an interface (I/F) unit 21, an input operation detecting unit 22, an assist processing unit 23, a storage unit 24, a map generation unit 25, and a control unit 26.

The interface (I/F) unit 21 performs an input/output interface operation with the content projection unit 12.

In the above configuration, the interface unit 21 is implemented as a communication interface such as a USB interface or an Ethernet (registered trademark) interface.

The input operation detecting unit 22, the assist processing unit 23, the map generation unit 25, and the control unit 26 include an MPU and a memory such as a ROM or a RAM, are configured as a so-called microcomputer, and are implemented by the MPU executing a program loaded on the memory.

The storage unit 24 is implemented as a semiconductor memory device such as a RAM, a flash memory, or an SSD that temporarily stores data, a hard disk, or the like.

The input operation detecting unit 22 detects an input operation of the user US on the basis of input data from the content projection unit 12.

The assist processing unit 23 performs assist processing such as input position correcting processing and processing of generating various assist displays to be described later on the basis of the input operation detected by the input operation detecting unit 22.

The storage unit 24 stores data necessary for generating a 3D map, various types of content data, and the like.

The map generation unit 25 generates a 3D map in a real space on which a projector projection area AP can be formed on the basis of the input data from the content projection unit 12.

The control unit 26 drives the content projection unit 12, controls a video (image) projected by the content projection unit 12, and controls the entire information processing device 11.

In the above configuration, the assist processing unit 23 includes: an input position correcting unit 31 that performs input position correcting processing of correcting an input position based on an operation of the instruction input device 13 on the basis of the input operation detected by the input operation detecting unit 22; and an assist display generating unit 32 that generates assist display data and the like for performing assist display such as display of guide lines at the time of content operation.

Furthermore, the control unit 26 includes a drive control unit 33 that performs drive control of the content projection unit 12 for changing the projection position of the content projection unit 12 on the basis of the input operation detected by the input operation detecting unit 22 and a video control unit 34 that performs control of a video (image), assist display, or the like to be projected onto the real space on the basis of the input operation detected by the input operation detecting unit 22.

The content projection unit 12 includes a driven unit 41 and a driving unit 42.

The driven unit 41 roughly includes a display unit 51 that actually projects content and a sensor unit 52 that performs sensing of various types of information.

In the above configuration, the display unit 51 includes a projector 55 that performs content projection display on the real space.

The sensor unit 52 includes a depth sensor 56, a stereo IR camera 57, and an overhead camera 58.

The depth sensor 56 is configured as a so-called time of flight (TOF) sensor and acquires a distance-visible image, which is used for creating a three-dimensional (3D) map of the real space, user position estimation, and user posture estimation. More specifically, the depth sensor 56 creates a 3D map (three-dimensional information) of the entire space in advance by being driven integrally with the projector 55. In addition, it is also possible to use a passive/active stereo or structured light method or to use the depth sensor 56 for detecting an input position of the instruction input device.

Note that the depth sensor 56 is not limited to a TOF sensor, and an infrared type, an ultrasonic type, a laser range finder, or the like can also be used. In addition, the number of the depth sensors 56 to be installed is not limited to one, and a plurality of depth sensors 56 may be installed. Furthermore, the 3D map may be sequentially acquired for the space in the content projection direction or may be acquired for the entire content projection space at the time of system installation.

The stereo IR camera 57 is used for infrared distance image acquisition used for input position detection and captures an input position in the projection area by being driven integrally with the projector 55.

The overhead camera 58 is used for detecting an input position of an instruction position in the real space or acquiring an infrared distance image. It is also used to change the projection direction of the projector 55 to a spatial position detected by the overhead camera 58.

The driving unit 42 is biaxially driven and includes a plurality of motors 59 and can set a content display position (content projection position) of the projector 55 of the display unit 51 at a desirable position in the up-down direction and in the left-right direction.

According to the above configuration, when the projector 55 is driven to project and display content including the UI and the like on a desired area in the real space and an input operation is performed by the instruction input device 13, it is possible to implement a good input operation matching the real space by correcting the input operation position and performing assist display using information of the measured space where the content is projected, the input position information of the user, and information of the input operation target.

Figure 3:
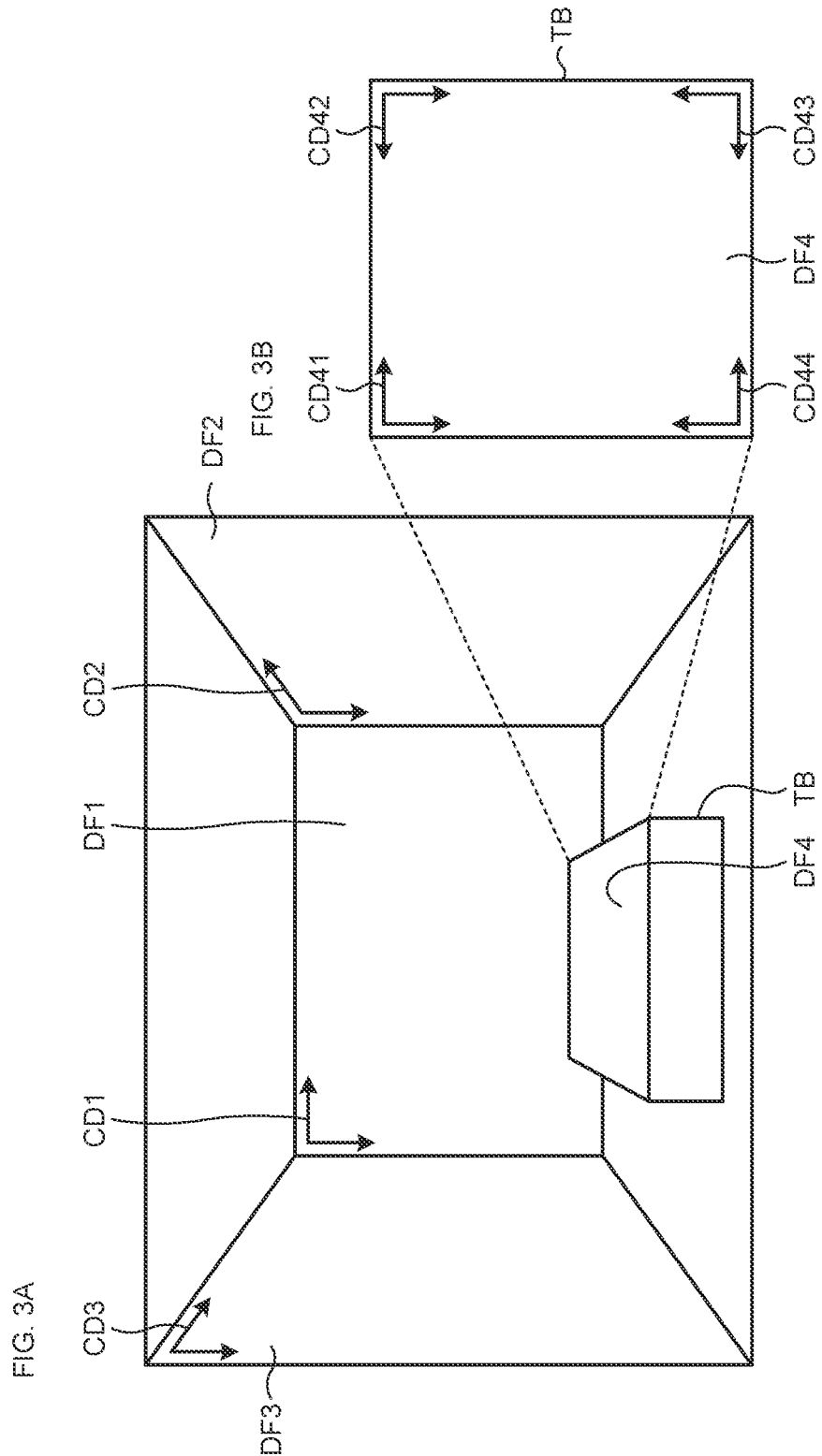
FIGS. 3A and 3B are explanatory diagrams of an example of a display plane in the content display system.

FIGS. 3A and 3B are explanatory diagrams of an example of a display plane in the content display system.

In a case where the content projection unit 12 is provided on one of the walls in a room, a first display plane (content projection plane) DF1 is set on a wall facing the wall on which the content projection unit 12 is provided, a second display plane DF2 is set on the right wall, and a third display plane DF3 is set on the left wall.

Moreover, coordinate systems CD1 to CD3 corresponding to the display planes DF1 to DF3, respectively, are set. In this case, for example, two axes (such as X axis and Y axis) orthogonal to each other are set for the coordinate systems CD1 to CD3.

Furthermore, the top surface of a table TB installed in the room is set as a fourth display plane DF4.

For the display plane DF4, since the user US can be positioned in any direction around the table TB, four coordinate systems CD41 to CD44 are set.

In this case, for example, two axes (such as X axis and Y axis) orthogonal to each other are set as the coordinate systems CD41 to CD44, and one coordinate system is set in a state rotated by 90°, 180°, or 270° with respect to another coordinate system.

Next, the operation of the first embodiment will be described.

Figure 4:
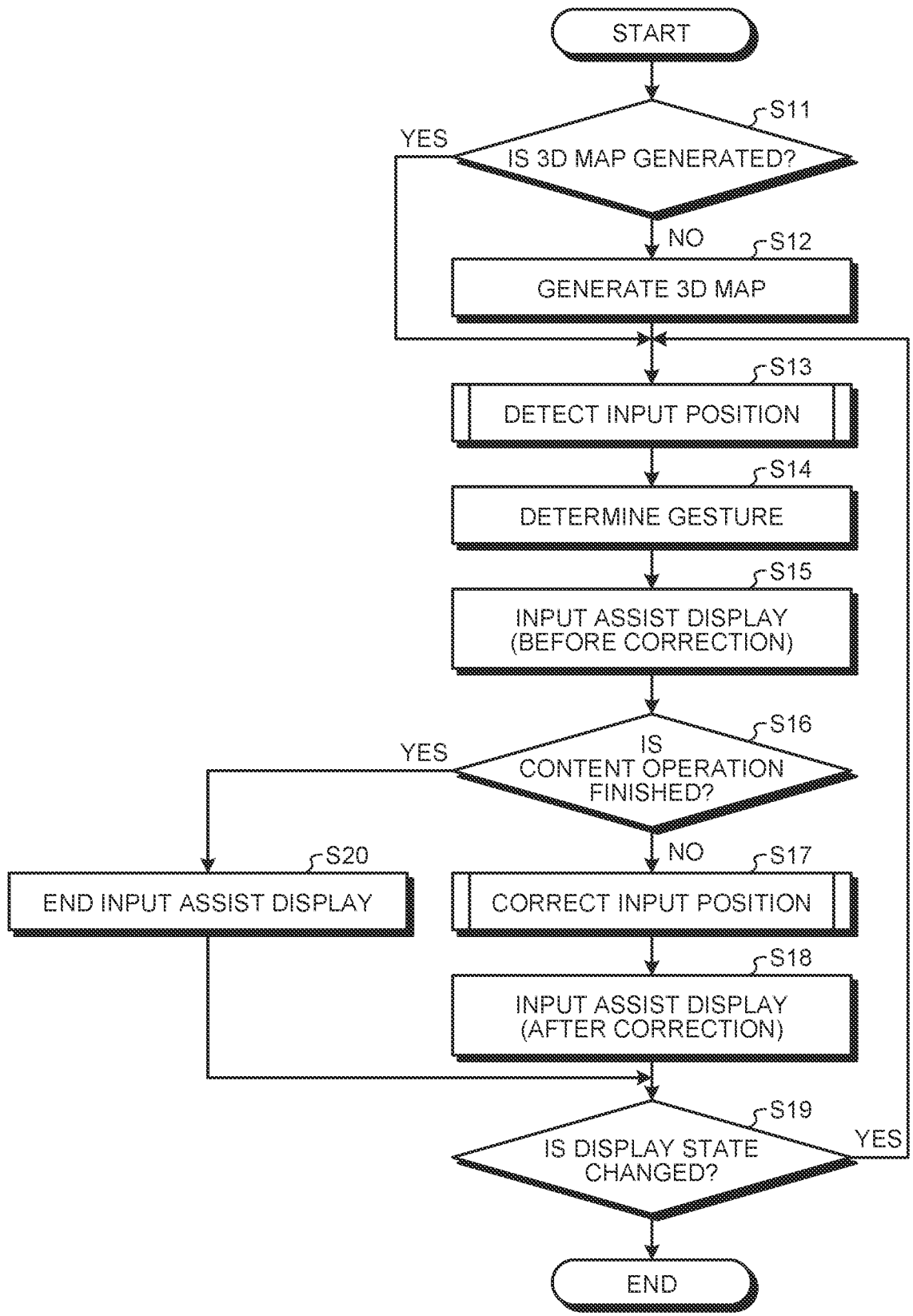
FIG. 4 is an operation flowchart of the first embodiment.

FIG. 4 is an operation flowchart of the first embodiment.

First, the information processing device 11 determines whether or not a 3D map has been generated (Step S11).

If it is determined in Step S11 that a 3D map has already been generated (Step S11; Yes), the processing proceeds to Step S13.

If it is determined in Step S11 that a 3D map has not been generated yet (Step S11; No), the information processing device 11 acquires the shapes of the projection planes (in the above example, the projection planes DF1 to DF4 and generates a 3D map on the basis of the output data of the depth sensor 56 (Step S12).

Subsequently, the information processing device 11 estimates the input direction of the user US and detects the input direction as the input position of the input device in the 3D map (Step S13).

Here, detection of the input direction of the user will be described in detail.

The following four approaches are conceivable for estimation of the input direction of the user.
(1) Estimate on the basis of the orientation of the body of the user US
(2) Estimate on the basis of the orientation of the face or the line of sight of the user US
(3) Estimate on the basis of the orientation of the input device
(4) Estimate on the basis of the sensor state of a wearable device First, a method of estimating the input direction of the user US on the basis of the orientation of the body of the user US will be described.

Figure 5:
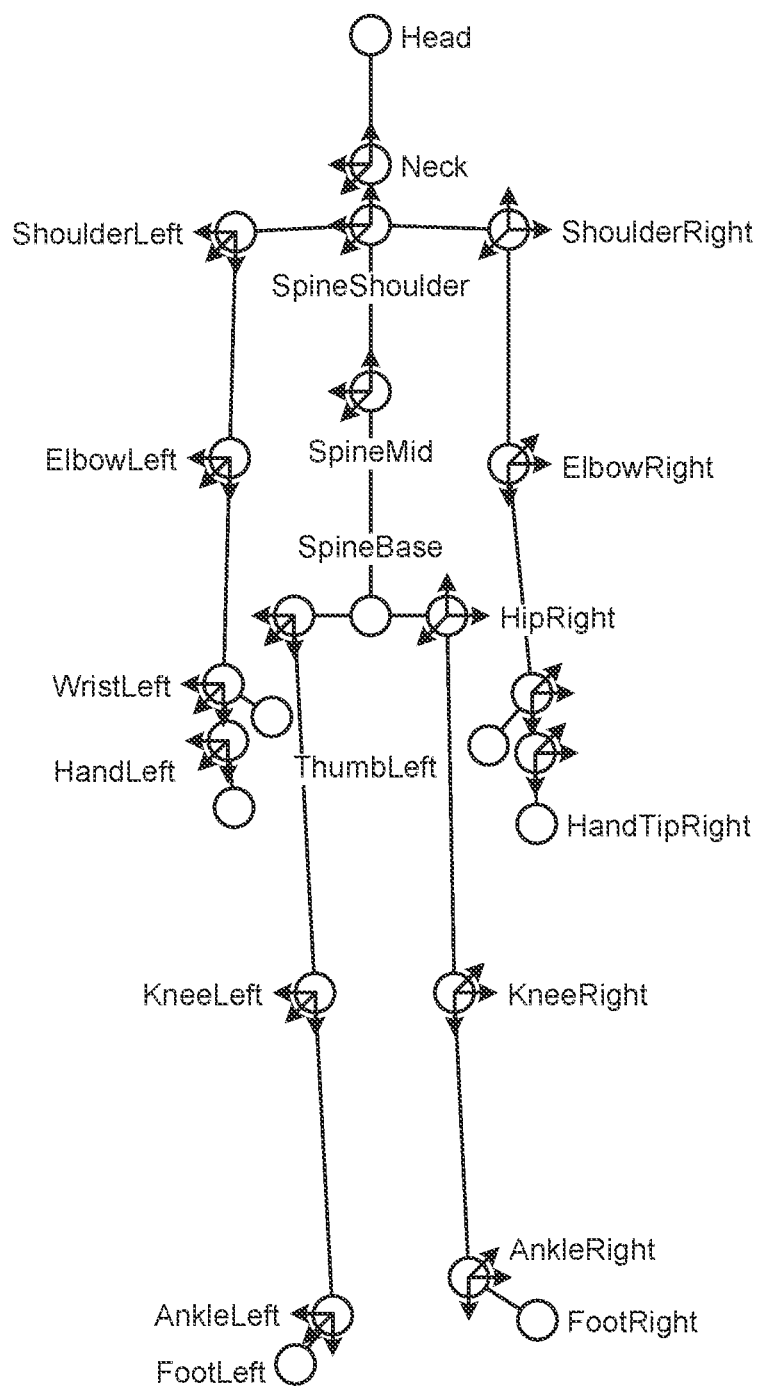
FIG. 5 is a diagram explaining an example of indirect information used for posture estimation.

FIG. 5 is a diagram explaining an example of indirect information used for posture estimation.

In the method of estimating the input direction of the user US on the basis of the orientation of the body of the user US, the input direction is estimated using information of joints in a posture detected from the three-dimensional distance data acquired by the depth sensor.

More specifically, the rotation direction of the upper body is estimated on the basis of rotation of joint information SpineMid and joint information SpineShoulder.

Furthermore, a rotation direction of the neck is estimated on the basis of rotation of joint information Neck.

Furthermore, it is also possible to define the input direction of the user on the basis of vector directions of the fingers. That is, a vector direction from joint information Hand to joint information HandTip is defined as the input direction of the user.

Furthermore, in a case where the input is performed using the fingers of the user US instead of the pointing device, it is also possible to detect the input position of the user by detecting the vector direction of a finger used for the input.

Alternatively, it is also possible to estimate the input direction using joint information of a posture estimated on the basis of two-dimensional data captured by the overhead camera.

Next, a method of estimating the input direction of the user US on the basis of the orientation of the face or the line of sight of the user will be described.

In the method of estimating the input direction of the user US on the basis of the direction of the face or the line of sight of the user US, it is also possible to provide a camera capable of photographing the user from the front side and to estimate the input direction using the face and the line of sight direction detected from two-dimensional data acquired by the camera.

Next, a method of estimating the input direction of the user on the basis of the orientation of the input device will be described.

In the method of estimating the input direction of the user on the basis of the orientation of the input device, the input direction is estimated using posture information of the instruction input device 13 detected from the three-dimensional distance data acquired by the depth sensor.

For example, the posture is estimated by pattern recognition of the shape of the instruction input device 13 such as a pen.

Alternatively, the input direction is estimated using the posture of the instruction input device 13 estimated from the two-dimensional data imaged by the camera.

Instead of the above, it is also possible to estimate the input direction using device posture information estimated from data of an inertial sensor or a geomagnetic sensor built in the input device.

Alternatively, it is also possible to estimate the input direction from the shape of the output light of the input device and the shape of the reflected light of the output light captured by the camera for detecting the input position. Specifically, a direction based on a difference between the shape of the output light captured by the IR camera (for example, circle-shaped IR light) and the shape of the reflected light of the output light on the input surface (for example, ellipse-shaped IR light) is estimated as the input direction (for example, in a case where the reflected light of the circle-shaped output light has an elliptical shape, the direction along the longitudinal direction of the ellipse).

Next, a method of estimating the input direction of the user on the basis of the sensor state of a wearable device will be described.

For example, the input direction is estimated using posture information of the body estimated from data of an inertial sensor or a geomagnetic sensor.

For example, in a sensor of a wrist watch-type device, the input direction is estimated using the vector direction of the wrist.

In addition, in a sensor of a ring-type device, the input direction is estimated using the vector direction of a finger.

Furthermore, the input direction may be estimated using a self position estimated from data of a camera, an inertial sensor, a geomagnetic sensor, or the like.

Here, estimation processing of the input direction of the user US will be described.

FIG. 6 is an estimation processing flowchart of the input direction of the user US.

First, the information processing device 11 acquires an infrared distance image by the stereo IR camera 57 (Step S21).

Subsequently, the information processing device 11 performs binarization processing on the obtained infrared distance image by using a predetermined threshold value (Step S22) and detects the input position (input direction) of the user US (Step S23).

Specifically, contour extraction is performed, and detection of an input position (input direction: input area) of the user US an instruction on which is given by the instruction input device 13 is performed.

Subsequently, the information processing device 11 determines whether or not the detection of the input position (input direction) of the user US has succeeded (Step S24).

If the detection of the input position (input direction) of the user US has failed in the determination of Step S24 (Step S24; No), it is regarded that the input is not being performed, and the processing of estimating the input direction of the user US is terminated.

If the detection of the input position (input direction) of the user US is successful in the determination of Step S24 (Step S24; Yes), the information processing device 11 calculates the coordinate value of content CN1 which is an operation target (Step S25).

Specifically, distance information of the position of the center of gravity of the content CN1 which is an operation target is acquired and set as the coordinate value.

Subsequently, the information processing device 11 performs coordinate system transformation to obtain coordinate values in a world coordinate system and ends the processing of estimating the input direction of the user US (Step S26).

As a result, when the input direction of the user US is estimated, the information processing device 11 determines the gesture of the user US (Step S14).

For example, a content operation such as a click operation or a drag and drop operation of the user US is determined on the basis of an operation of an operation button (not illustrated) of the instruction input device 13, movement of the instruction input device 13, or a captured image of the camera.

Next, the information processing device 11 performs the input assist display before input position correction (Step S15).

Here, the input assist display state before the input position correction will be described with reference to drawings.

Figure 7A:
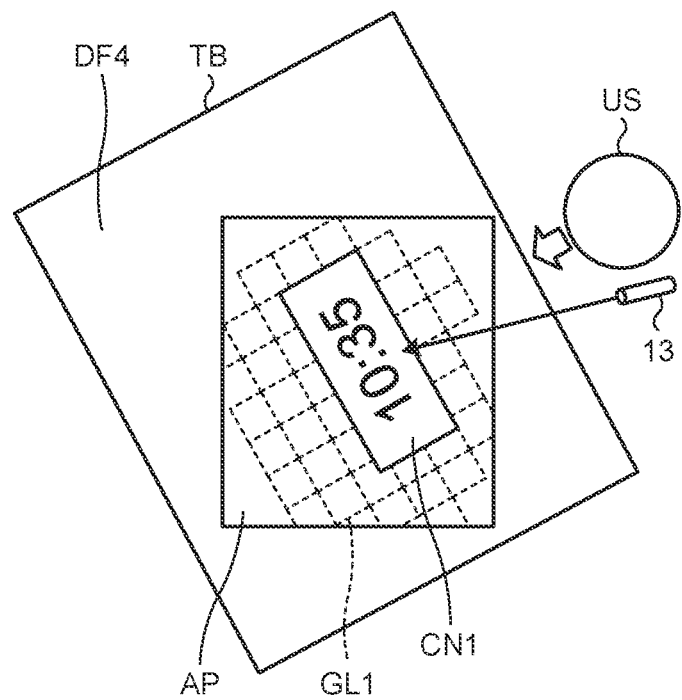
FIGS. 7A and 7B are explanatory diagrams of an example of input assist display.
Figure 7B:
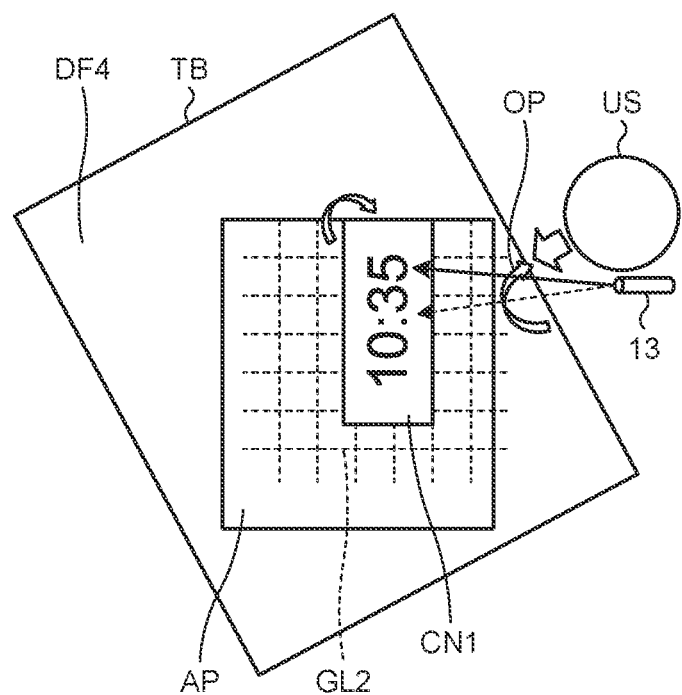

FIGS. 7A and 7B are explanatory diagrams of an example of input assist display.

FIG. 7A is a diagram illustrating a display state immediately after the user US performs a selection operation on the content CN1 by an operation (for example click operation) of an operation button or the like (not illustrated) of the instruction input device 13 in order to operate the content CN1 displayed in the projector projection area AP on the display plane DF4.

In this state, as illustrated in FIG. 7A, as input assist display, guide lines GL1 (in the case of FIG. 7A, grid-shaped guide lines) as a first display coordinate system based on the orientation of the displayed content CN1 are displayed by the information processing device 11.

In this state, as illustrated in FIG. 7B, in a case where the user US performs an operation OP (content operation; in this example, drag and drop operation) on the content CN1, the information processing device 11 displays new guide lines GL2 corresponding to a second display coordinate system based on the orientation of the content CN1 depending on the operation state and determines whether or not the content operation has ended (Step S16).

If it is determined in Step S16 that the content operation has ended (Step S16; Yes), the display (input assist display) of the guide lines GL2 based on the orientation of the content CN1 or the guide lines GL2 based on the orientation of projector projection area AP is ended, and the process proceeds to Step S19.

On the other hand, if it is determined in Step S16 that the content operation has not been finished yet (Step S16; No), the information processing device 11 performs input position correcting processing (Step S17).

FIGS. 8A, 8B, and 8C are explanatory diagrams of input position correcting processing.

Here, as the input position correcting processing, in the case of FIG. 7B, in a case where one end of the content CN1 abuts against one side of the projector projection area AP, the content CN1 is displayed in accordance with the orientation of the projector projection area AP, and the content CN1 is prevented from moving any further. Alternatively, in a case where any of the coordinates for the four corners of the content CN1 reaches outside the projector projection area AP, the display position or the rotation angle of the content CN1, as the display content, is changed so that all of the coordinates for the four corners of the content CN1 fall within the area of the projector projection area AP.

That is, as illustrated in FIG. 8A, in a case where even a part of the display area of the content CN1 deviates from the projector projection area AP by the content operation of the user US corresponding to the input direction USD of the user US, the information processing device 11 performs processing so that the content CN1 as the display content falls within the projector projection area AP. For example, in a case where any one of the coordinates for the four corners of the content CN1 deviates from the coordinate range of the projector projection area AP, the display position or the display angle of the content CF1, which is the display content, is changed so that all of the coordinates for the four corners of the content CN1 fall within the coordinate range of the projector projection area AP.

More specifically, in a case where a movement angle A1 and a movement angle A2 are detected by a movement operation of the content CN1 as illustrated in FIG. 8B, the content CN1 is moved (rotated) on a basis of the movement angle A1 which is an acute angle. That is, the display position or the display angle of the content CN1 is changed.

Then, as illustrated in FIG. 8C, in the case of the content CN1 having a rectangular shape, the information processing device 11 performs input position correction so that one side of the display area of the content CN1 coincides with one side (one side on the upper side in the figure) of the projector projection area AP and displays the content CN1 together with the guide lines GL2 as the second display coordinate system. In this case, the guide lines GL2 are set to one side of the projector projection area AP, that is, the second display coordinate system is set to a coordinate system based on the coordinate system of the display unit.

Note that instead of the coordinate system bead on the coordinate system of the display unit, it is also possible to use a coordinate system set in advance depending on the shape of a real object or a coordinate system set on the basis of an inclination angle of the display plane with respect to the horizontal plane.

In the above description, the case where one side of the display area of the content CN1 coincides with one side (one side on the upper side in the figure) of the projector projection area AP has been described. However, all the coordinates for the four corners of the content CN1 may be caused to fall within the coordinate range of the projector projection area AP by making one of the coordinates for the four corners of the content CN1 to abut on one side of the projector projection area AP.

Furthermore, in a case where the content CN1 falls within the projector projection area AP by rotating the content CN1 within a predetermined rotation angle (for example, 22.5°) about the center of gravity of the content CN1 (in the case of the rectangular content CN1, the midpoint of a diagonal line) as the rotation center at the arrangement position of the content CN1 designated by the user US, it is also possible to perform the input correction display in this manner.

Furthermore, in this case, the display angle may be changed as appropriate on the basis of the orientation or the like of the user US with one of the coordinates for the four corners of the content CN1 at which the content CN1 is in contact with one side of the projector projection area AP as the center as necessary.

Therefore, in a case where the user US intends to display the content CN in the projector projection area AP, the content CN1 is always displayed in the projector projection area AP on the basis of the orientation or the like of the user regardless of the operation state of the user US.

Then, as illustrated in FIG. 7B, as the input assist display, the guide lines GL (in the case of FIG. 7B, grid-shaped guide lines) corresponding to the second display coordinate system based on the corrected orientation of the content CN1, that is, the orientation of the projector projection area AP is displayed by the information processing device 11.

Subsequently, the information processing device 11 determines whether or not the change of the display state of the content CN1 has been completed (Step S19).

In the determination in Step S19, in a case where the user US still continues the operation on the content CN1, it is determined that the change of the display state of the content CN1 has not been completed yet (Step S19; No), the processing proceeds to Step S13 again, and the same processing as described above is performed.

Alternatively, in the determination in Step S19, in a case where the user US ends the operation on the content CN1 and the change of the display state of the content CN1 is completed (Step S19; Yes), the information processing device 11 ends the process.

In the above description, the grid-shaped guide lines GL are displayed as the input assist display; however, it is also possible to perform input assist display of other modes.

Figure 9:
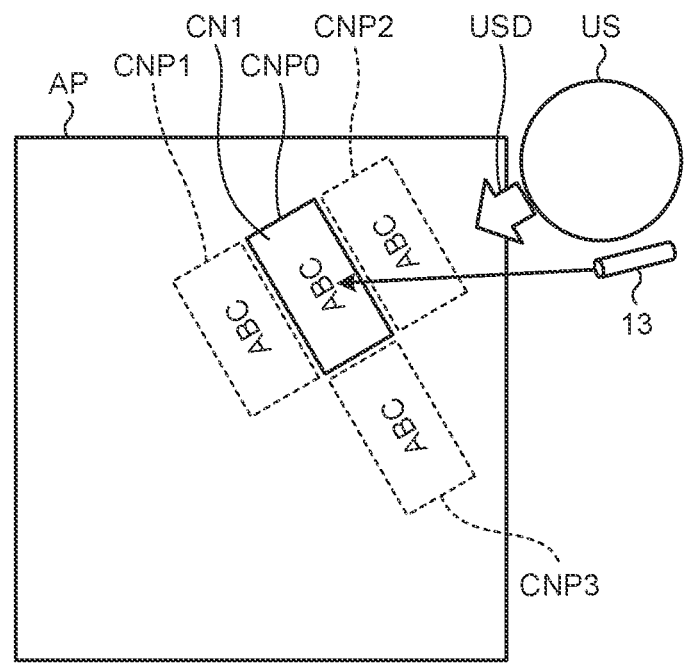
FIG. 9 is an explanatory diagram of input assist display according to a first other aspect.

FIG. 9 is an explanatory diagram of input assist display according to a first other aspect.

In FIG. 9, in a case where the display position of the content CN1 that is the current operation target in the projector projection area AP is a display position CNP0, display positions CNP1 to CNP3, which the content CN1 can move to without changing the orientation thereof, allow the content CN1 to fall within the projector projection area AP, and are adjacent to a display position CNP0, are displayed as input assist display.

Figure 10A:
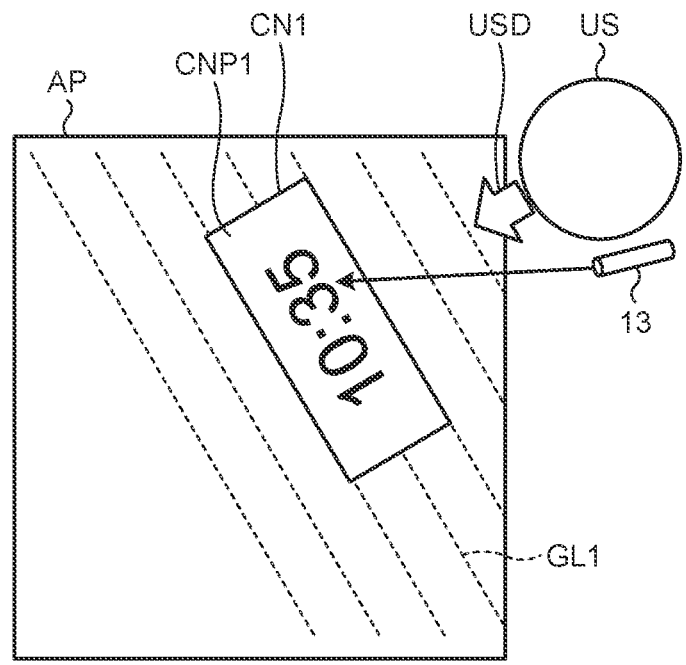
FIGS. 10A and 10B are explanatory diagrams of input assist display according to a second other aspect.
Figure 10B:
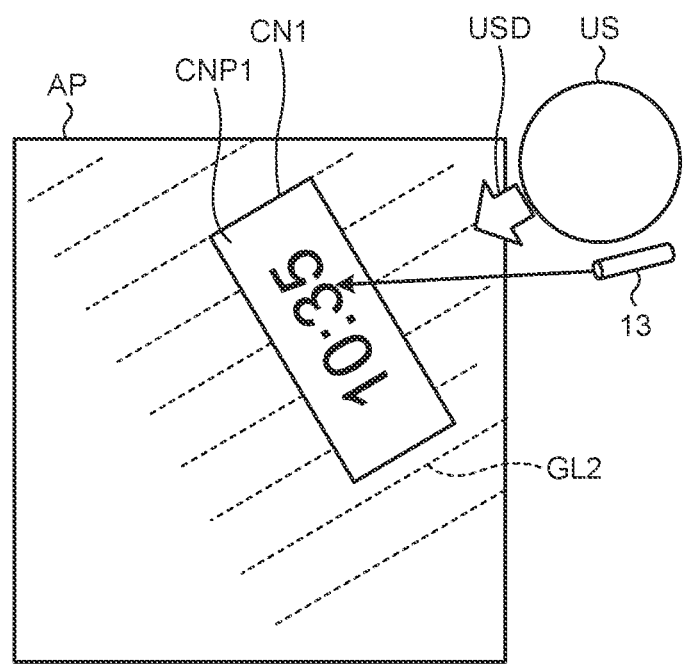

FIGS. 10A and 10B are explanatory diagrams of input assist display according to a second other aspect.

In FIG. 10A, in a case where the display position of the content CN1 that is the current operation target in the projector projection area AP is the display position CN11, a plurality of guide lines GL1 (uniaxial auxiliary line) as the first display coordinate system is displayed along a direction orthogonal to the up-down direction of a character (string) included in the content CN1 without changing the orientation of the content CN1.

Meanwhile, in FIG. 10B, in a case where the display position of the content CN1 that is the current operation target in the projector projection area AP is the display position CN11, the guide lines GL2 (uniaxial auxiliary line) as the second display coordinate system are displayed along the up-down direction of a character (string) included in the content CN1 without changing the orientation of the content CN1.

FIG. 11 is an explanatory diagram of input assist display according to a third other aspect.

In FIG. 11, in a case where content CN2 that is the current operation target is not rectangular, a rectangular guide frame GF along the current input direction USD is displayed.

FIGS. 12A, 12B, and 12C are explanatory diagrams of input assist display and an input assist operation according to a fourth aspect.

FIG. 12A is a diagram illustrating a case where, when viewed from a side, as illustrated in FIG. 12B, the top surface of the table TB has different inclinations with respect to a boundary line BL, and the projector projection area AP is divided into two areas of a horizontal projector projection area AP1 and a projector projection area AP2 rising from the horizontal plane at a predetermined angle.

In this case, as illustrated in FIG. 12A, it is assumed that the content CN1 which is an operation target by a content operation of the user US extends over both the projector projection area AP1 and the projector projection area AP2 since the user US moves the content CN1 from the projector projection area AP1 to the projector projection area AP2 side.

In this case, the information processing device 11 deems that the user US intends to display the content CN1 on the projector projection area AP2 side and, as illustrated in FIG. 12C, displays the grid-shaped guide lines GL, which is the second display coordinate system, as the input assist display along the orientation of the boundary line BL and displays the content CN1 along the grid-shaped guide lines GL2.

As a result, it is possible to display the content CN1 with less sense of incongruity despite some difference from the input direction of the user US.

FIGS. 13A, 13B, and 13C are explanatory diagrams of input assist display and an input assist operation according to a fifth aspect.

Similarly to the case of FIGS. 12A, 12B, and 12C, FIG. 13A is a diagram illustrating a case where, when viewed from a side, as illustrated in FIG. 13B, the top surface of the table TB has different inclinations with respect to a boundary line BL, and the projector projection area AP is divided into two areas of a horizontal projector projection area AP1 and a projector projection area AP2 rising from the horizontal plane at a predetermined angle.

However, unlike the case of FIGS. 12A, 12B, and 12C, there is no sufficient display area for displaying the content CN1 which is an operation target in the projector projection area AP2.

In this case, in a case where the content CN1 which is an operation target extends over both the projector projection area AP1 and the projector projection area AP2 since the user US moves the content CN1 from the projector projection area AP1 to the projector projection area AP2 side as illustrated in FIG. 13A, the information processing device 11 attempts to perform processing on the assumption that the user US intends to display the content CN1 on the projector projection area AP2 side.

However, since the display area is insufficient, as illustrated in FIG. 13C, the grid-shaped guide lines GL2 as the second display coordinate system are displayed as the input assist display along the orientation of the boundary line BL at an end of the horizontal projector projection area AP1, and the content CN1 is displayed along the grid-shaped guide lines GL.

As a result, it is possible to display the content CN1 with less sense of incongruity despite some difference from the intent of the user US.

Figure 14A:
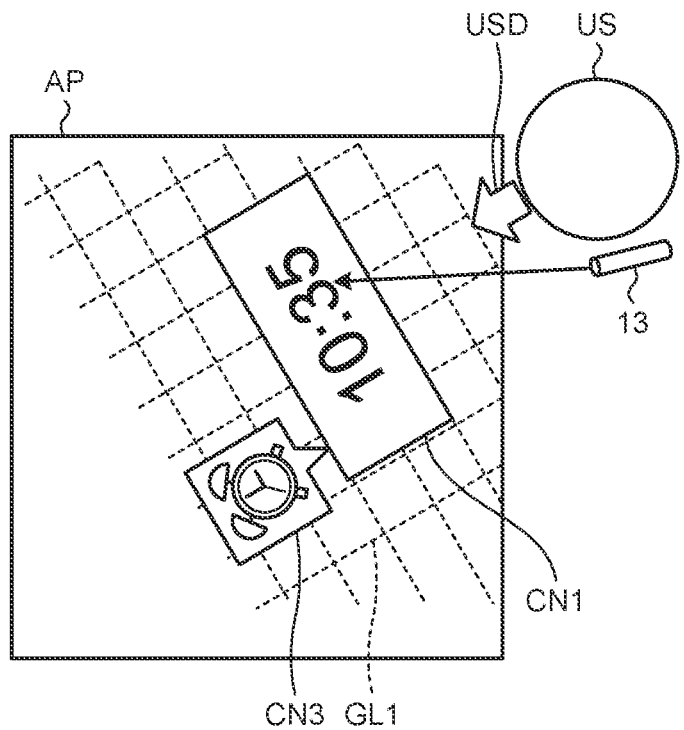
FIGS. 14A and 14B are explanatory diagrams of input assist display and an input assist operation according to a sixth aspect.
Figure 14B:
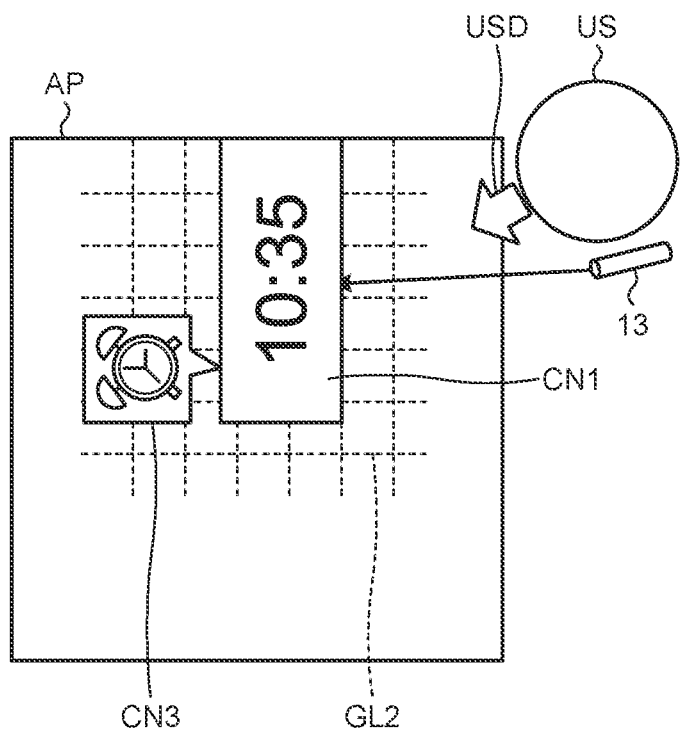

FIGS. 14A and 14B are explanatory diagrams of input assist display and an input assist operation according to a sixth aspect.

In each of the above aspects, in a case where additional content CN3 is displayed as additional information of the content CN1 that is the operation target as an input assist operation in a case where the content CN1 is displayed in the projector projection area AP, as illustrated in FIG. 14A, the orientation of the additional content CN3 is caused to coincide with the orientation of the content CN1 that is the operation target along the guide lines GL1 as the first display coordinate system and is thereby displayed. An example is a case of FIG. 14A in which the additional content CN3 as an icon for providing notification that alarm setting has been set in clock display is additionally displayed during the operation.

Then, in a case where the user US changes the display position of the content CN1 which is the operation target by the instruction input device 13, as illustrated in FIG. 14B, the grid-shaped guide lines GL2, as the second display coordinate system, are displayed as the input assist display, the content CN1 is displayed along the grid-shaped guide lines GL2, and the additional content CN3 is displayed along the new grid-shaped guide lines GL2.

Figure 15A:
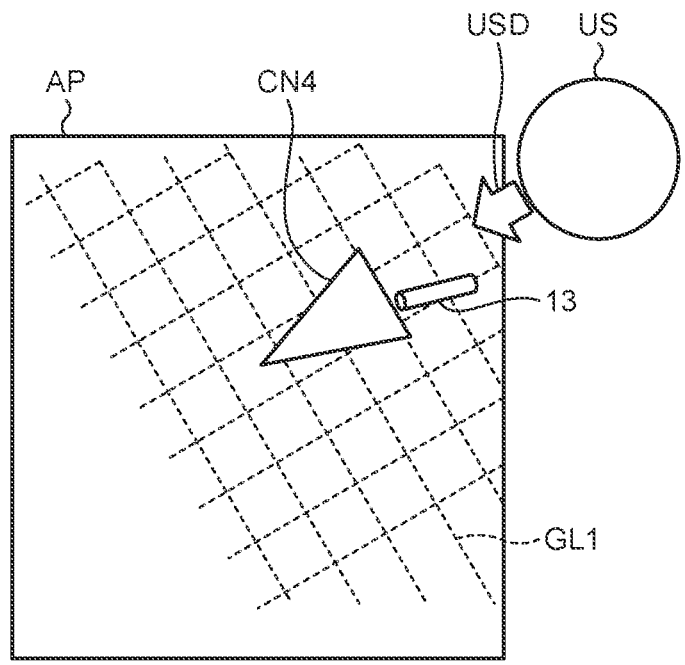
FIGS. 15A and 15B are explanatory diagrams of input assist display and an input assist operation according to a seventh aspect.
Figure 15B:
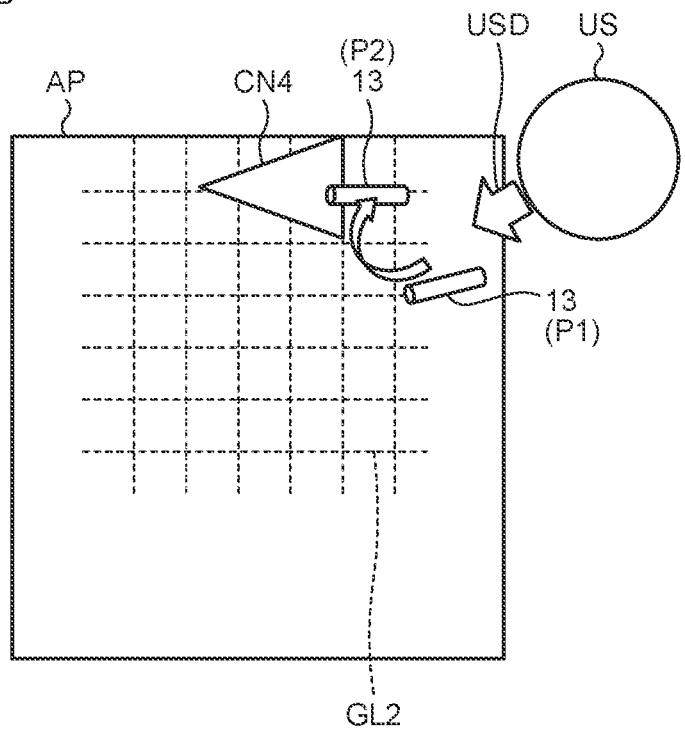

FIGS. 15A and 15B are explanatory diagrams of input assist display and an input assist operation according to a seventh aspect.

The above description pertains to cases where a display screen or the like of an application is handled as content of a display operation target. However, as illustrated in FIG. 15A, the above description is similarly applicable to a case where a straight line or a figure is handled as content of a display operation target.

Specifically, as illustrated in FIG. 15A, when graphic content CN4, which is a display operation target, is selected by the instruction input device 13, grid-shaped guide lines GL1 as the first display coordinate system along the orientation of the display user US are displayed as the input assist display.

Then, when the display position is changed by moving the instruction input device 13 from a position P1 to a position P2, as illustrated in FIG. 15B, the grid-shaped guide lines GL2 as the second display coordinate system along the orientation of the instruction input device 13 are displayed as the input assist display, and the graphic content CN3 is displayed along the grid-shaped guide lines GL2.

Figure 16:
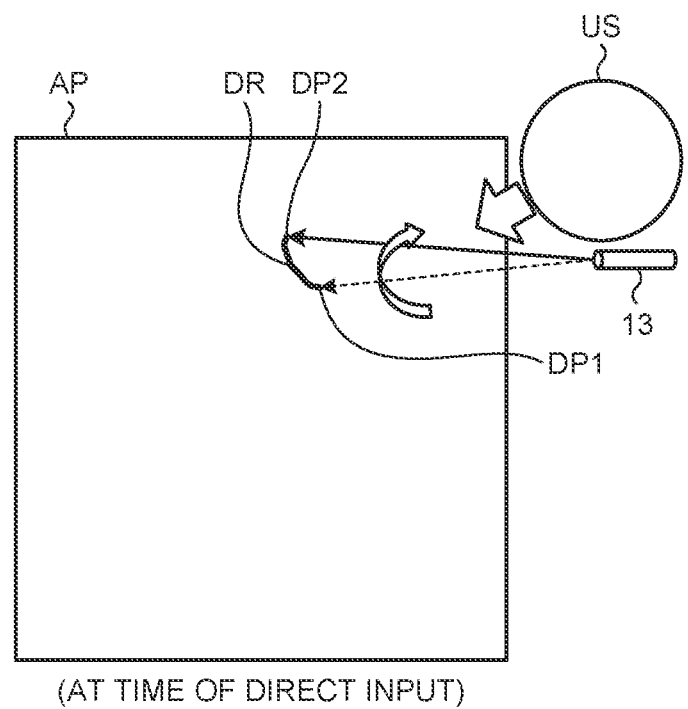
FIG. 16 is an explanatory diagram of an exception of the input assist operation.

FIG. 16 is an explanatory diagram of an exception of the input assist operation.

Each of the above modes is a case where the input assist display and the input assist operation are performed on the content as a display operation target; however, as illustrated in FIG. 16, at the time of direct input in which a graphic DR, which is a curve extending from the position DP1 to the position DP2, is drawn by the instruction input device 13, the information processing device 11 performs control so that the input assist display and the input assist operation are not performed.

That is, the operation modes of the instruction input device 13 include a pointing mode for selecting the display content or giving an instruction on the display position and a free-drawing mode for performing handwriting input, and the information processing device 11 prohibits changing the display coordinate system in the free-drawing mode, and thus the display position or the display angle of the content on which drawing is performed is not changed in the free-drawing mode.

However, in a case where the direct input is ended after the graphic DR has been drawn, the input assist display and the input assist operation can be performed on the graphic DR that has been drawn as the content of a display operation target similarly to the above-described processing.

In the above description, the operation is performed on the content on one display plane (in the above example, the display plane DF4); however, in the actual content display system 10, the content can be operated using a plurality of display planes.

Figure 17:
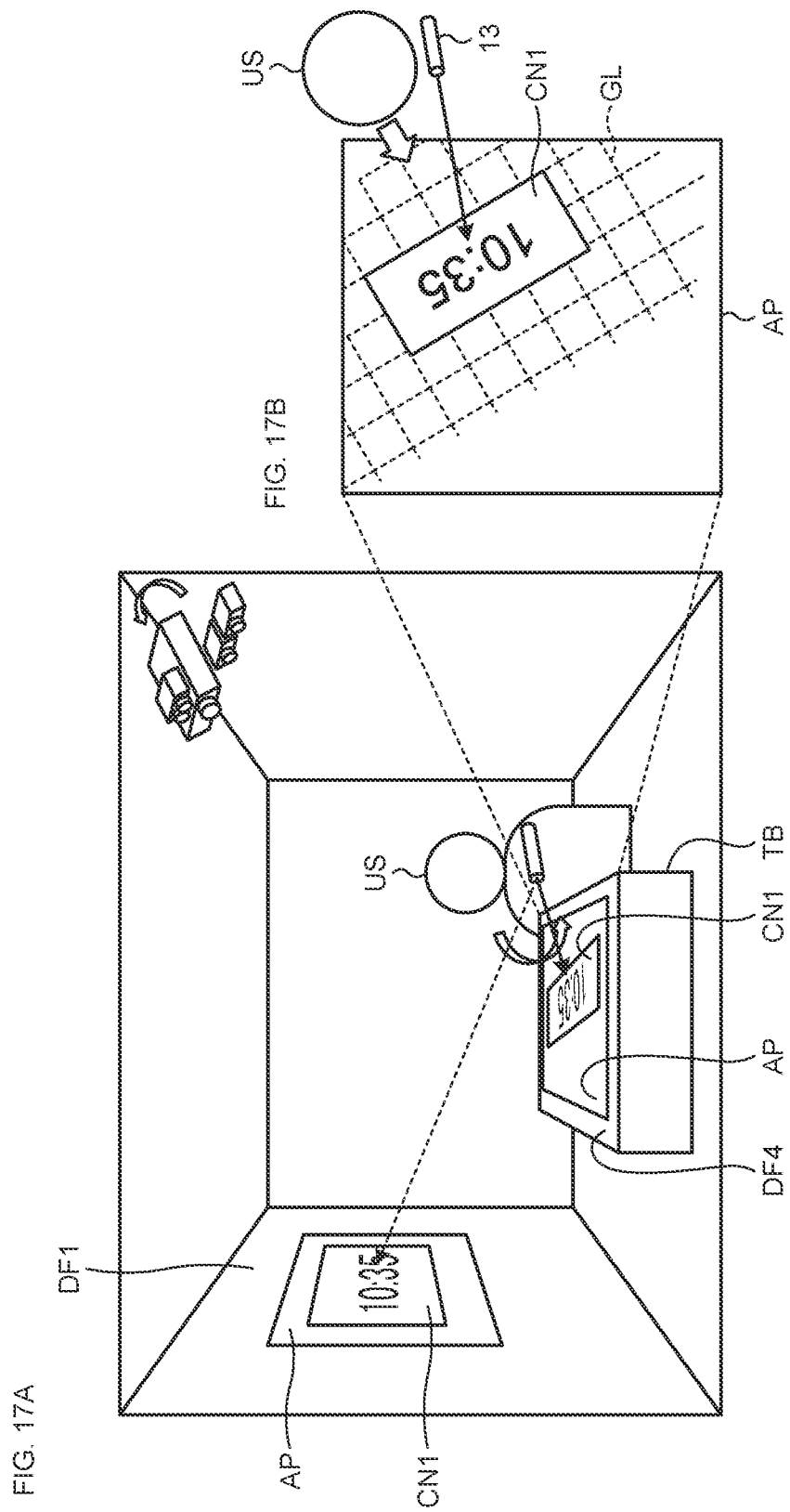
FIGS. 17A and 17B are explanatory diagrams of a difference in display control due to a difference in the place where a display plane is set.

FIGS. 17A and 17B are explanatory diagrams of a difference in display control due to a difference in the place where a display plane is set.

In this case, as described above, in a case where the projector projection area AP is set on the display plane DF4 and the input assist display and the input assist operation are performed in accordance with the orientation of the user US in the projector projection area AP, it is only required that the content including text information and the like be displayed in accordance with the orientation of the user US to facilitate use by the user US and that the content CN1, the guide lines GL as the input assist display, and the like be displayed in the projector projection area AP as illustrated in FIG. 17B.

However, in a case where the content CN1 handled on the display plane DF4 is moved and displayed on the display planes DF1 to D3 set on the walls by the operation of the instruction input device 13, it is preferable to perform display on the basis of the vertical direction, that is, along the coordinate systems CD1 to CD3.

Therefore, regardless of the display state on the display plane DF4, the content including the text information or the like is displayed on the display plane DF1 on the basis of the vertical direction in accordance with the coordinate system CD1 as illustrated in FIG. 17A.

Therefore, the user US can cause the optimum display to be performed at the destination where the content is displayed after moving without paying attention to which display plane the content is to be displayed on.

As described above, according to the first embodiment, in a case where a display coordinate system is switched from a first display coordinate system to a second display coordinate system with the display coordinate system immediately before the instruction input operation by the user deemed as the first display coordinate system and a display coordinate system corresponding to the orientation of the display content at the time of completion of the instruction input operation by the user deemed as the second display coordinate system, the display position or the display angle of the display content can be changed in accordance with the second display coordinate system, and a pointing input operation in a real space where there is no operation reference can be facilitated in a manner that matches the real space.

Although the switching timing or the display period of the input assist display has not been described in detail in the above description, for example, the switching and the display period may be set as follows.

The control unit 26 may perform the input assist display corresponding to the first display coordinate system in a case where the input assist display is performed before the display coordinate system is switched from the first display coordinate system to the second display coordinate system.

Then, after inputting the position or the angle by an input operation (after the input is confirmed), when the change of the position or the angle of the display content (displacement amount) by the input operation exceeds a threshold value, the control unit 26 may start the input assist display corresponding to the second display coordinate system.

In a case where the input operation is completed after the input assist display corresponding to the second display coordinate system has been performed, or when the position or the angle of a display object has not been changed by the input operation for greater than or equal to a predetermined period of time, the control unit 26 may end the input assist display corresponding to the second display coordinate system. The above similarly applies hereinafter.

[2] Second Embodiment

In the first embodiment described above, the cases where there is one user who operates the content have been described; however, in the present second embodiment, a case where there is a plurality of users who operate the content will be described.

Figure 18:
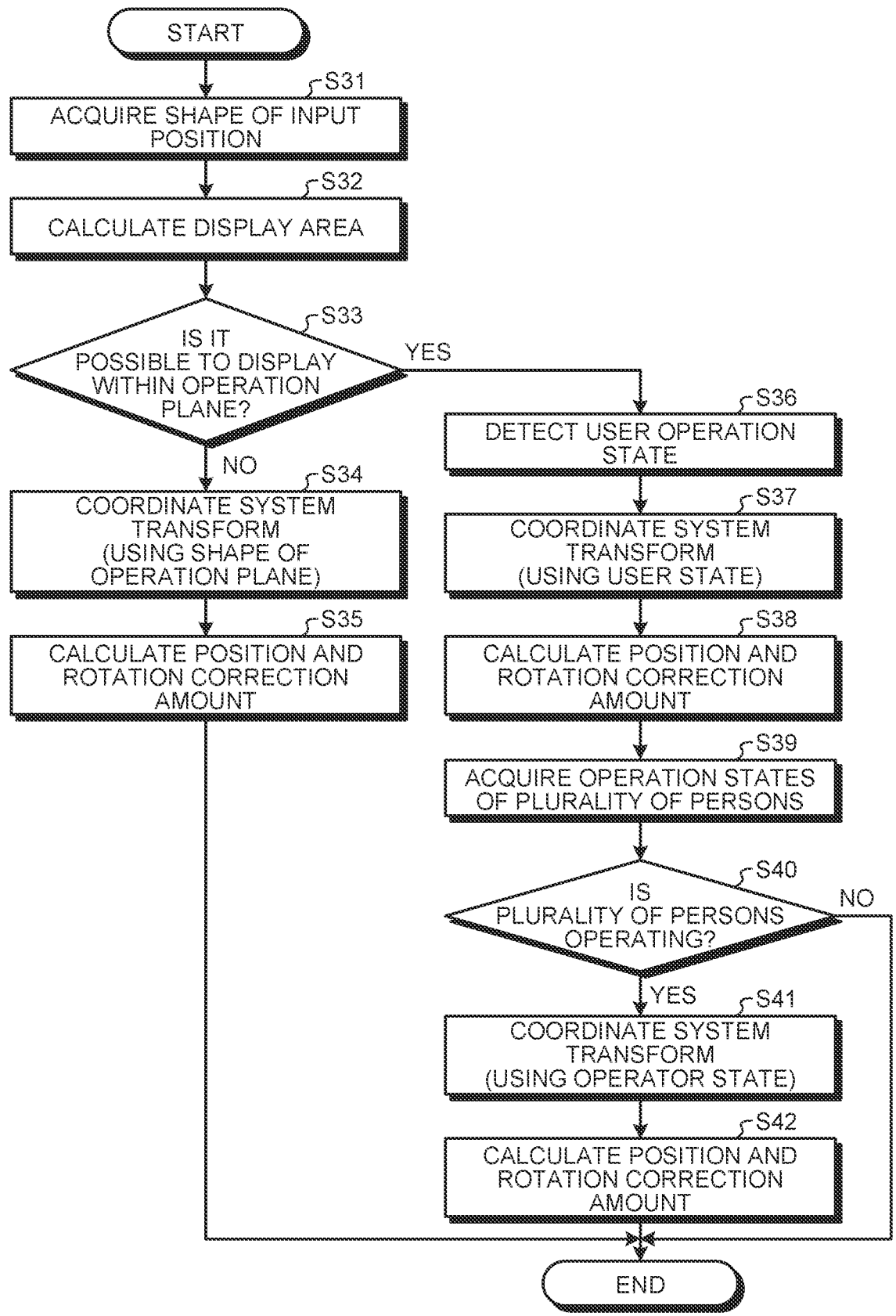
FIG. 18 is a processing flowchart of a second embodiment.

FIG. 18 is a processing flowchart of the second embodiment.

First, the information processing device 11 acquires shape information in a predetermined range around an operation position (Step S31).

Figure 19C:
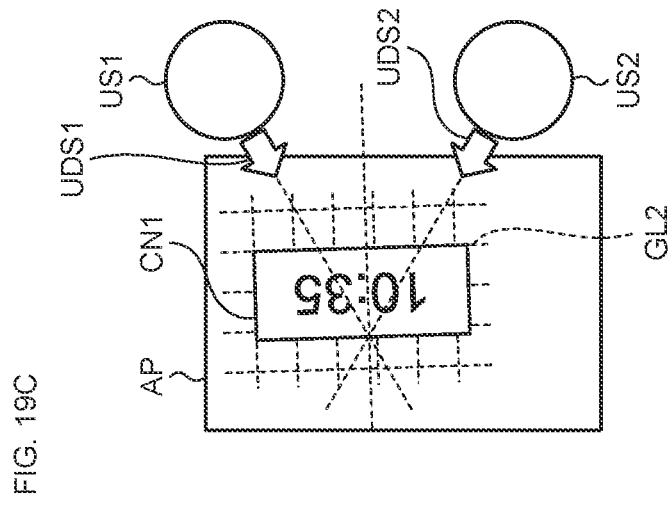
FIGS. 19A, 19B, and 19C are explanatory diagrams of operation states of a plurality of users.
Figure 19B:
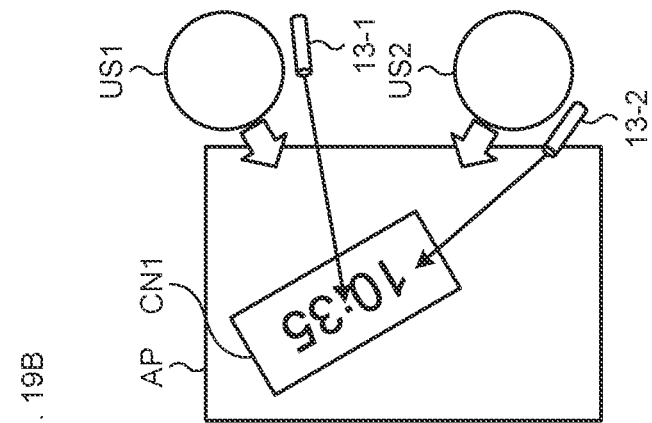
Figure 19A:
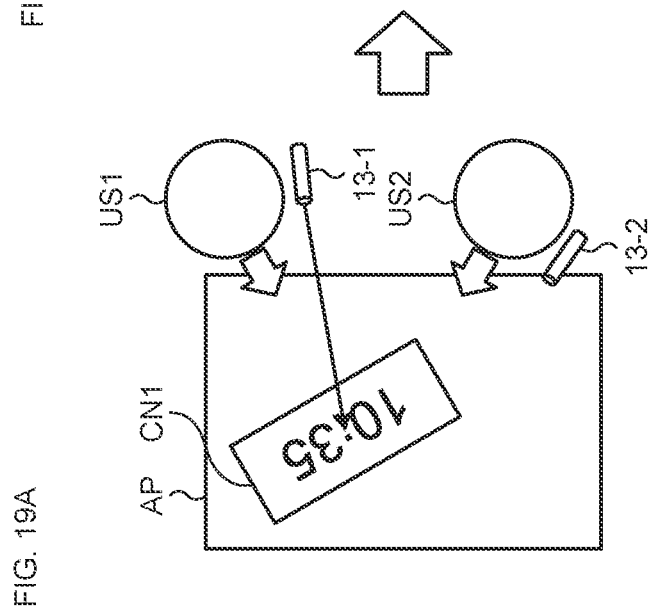

FIGS. 19A, 19B, and 19C are explanatory diagrams of operation states of a plurality of users.

Subsequently, the information processing device 11 calculates the size and the shape of the display area of the content to be operated at the input position (Step S32).

For example, in a case illustrated in FIG. 19A, the display size and the shape (in the present example, rectangle) are obtained on the basis of data of the content CN1.

Next, the information processing device 11 determines whether or not the content can be displayed on an operation plane on the basis of the calculated size and shape of the display area of the content (Step S33).

Specifically, as illustrated in FIG. 19A, it is determined whether or not the content CN1 to be operated can be displayed in the projector projection area AP. That is, it is determined whether or not the content CN1 has a size and a shape that allows the content CN1 to fit with respect to the size and the shape of the projector projection area AP.

If it is determined in Step S33 that the content to be operated can be displayed in the operation plane (Step S33; Yes), the information processing device 11 detects the operation state of the users (Step S36).

As illustrated in FIG. 19A, in a case where the first user US1 selects the content CN1 by an instruction input device 13-1, the information processing device 11 transforms the coordinate system into a coordinate system based on a first user US1 in consideration of the orientation and the like of the first user US1 (Step S37).

Subsequently, the information processing device 11 calculates the display position and the rotation correction amount of the content CN1 on the basis of the coordinate system that has been transformed into and displays the content CN1 by applying the display position and the rotation correction amount that have been calculated (Step S38).

Subsequently, the information processing device 11 acquires information regarding a state in which a plurality of users intends to operate the same content (Step S39).

Specifically, as illustrated in FIG. 19B, the information processing device 11 detects the operation states of the users and acquires a state, in which the first user US1 selects the content CN1 by the instruction input device 13-1 and the second user US2 selects the content CN1 which is the same content by an instruction input device 13-2, as information regarding a state in which the plurality of users intends to operate the same content.

Next, the information processing device 11 determines whether or not the plurality of users is performing an operation on the basis of the acquired information regarding the state in which the plurality of users intends to operate the same content (Step S40).

In the determination in Step S40, if in a state where only a single user (in the above example, only the first user US1) is operating the content (Step S40; No), the processing is ended.

In the determination in Step S40, if a plurality of users intends to operate the same content (Step S40; Yes), the coordinate system is transformed on the basis of the operation states of the respective operators (Step S41), and the content display position and the rotation correction amount are calculated (Step S42).

Specifically, as illustrated in FIG. 19C, in a case where an intersection angle between an input direction USD1 of the first user US1 and an input direction USD2 of the second user US2 is less than or equal to a predetermined angle, for example, less than or equal to 90°, a coordinate system transform is performed so that an orientation in the middle of the input direction USD1 and the input direction USD2 coincides with the orientation of the coordinate system (coincides with one of coordinate axes), the guide lines GL2 as the second display coordinate system are displayed, and the content CN1 is displayed in the orientation that goes along the guide lines GL2 of the second display coordinate system.

With such a configuration, it is possible to display the content CN1 in a state in which both the first user US1 and the second user US2 can easily view the content CN1 without sense of incongruity.

FIGS. 20A, 20B, and 20C are explanatory diagrams of another state in a case where the same content is operated by a plurality of persons.

As illustrated in FIG. 20A, in a case where the first user US1, out of the first user US1 and the second user US2, first selects the content CN1 by the instruction input device 13-1, the information processing device 11 transforms the coordinate system into a coordinate system based on the first user US1 in consideration of the orientation or the like of the first user US1 (Step S37), calculates the display position and the rotation correction amount of the content CN1 in accordance with the coordinate system that has been transformed into, and displays the content CN1 and the guide lines GL as assist display by applying the display position and the rotation correction amount that have been calculated (Step S38).

In this state, as illustrated in FIG. 20B, the information processing device 11 detects the operation states of the users and acquires a state, in which the first user US1 selects the content CN1 by the instruction input device 13-1 and the second user US2 selects the content CN1 which is the same content by an instruction input device 13-2, as information regarding a state in which the plurality of users intends to operate the same content.

And, in this case, since the intersection angle between the input direction USD1 of the first user US1 and the input direction USD2 of the second user US2 is greater than or equal to the predetermined angle, for example, greater than or equal to 90°, if the information processing device 11 performs the coordinate system transform so that the orientation in the middle of the input direction USD1 of the first user US1 and the input direction USD2 of the second user US2 coincides with the orientation of the coordinate system (coincides with one of the coordinate axes) and thereby displays the content CN1, the content CN1 is displayed in a state in which both the users US1 and US2 feel a sense of incongruity and feels uncomfortable with viewing.

Therefore in such a case, the content CN1 is displayed, for example, by displaying the guide lines GL2 based on only the operation state of a user who has first performed an operation on the content CN1, in the present example, the first user US1 as illustrated in FIG. 20C.

That is, it is possible to maintain the display state of the content CN1 displayed corresponding to the first user US1 at the time when the first user US1 has selected the content CN1 by the instruction input device 13-1 and to keep the display state with less sense of incongruity.

In the above description, the case where the display of the content CN1 after the transform of the coordinate system falls within the projector projection area AP has been described. However, in a case where the display of the content CN1 after the transform of the coordinate system does not fall within the projector projection area AP, like in the first embodiment, the information processing device 11 performs control so that the entire content CN1 is reliably displayed within the projector projection area AP which is the operation plane.

Moreover, the above description has been given with the example of the projector projection area AP set on the top surface of the table TB. However, as described above, in a case where a plurality of users simultaneously performs operations on the projector projection areas AP set on the display planes DF1 to DF3 set on the wall surfaces, the information processing device 11 performs control with a priority in aligning in the vertical direction when the content to be operated (particularly, content in which the vertical direction such as text is set) is rotated.

On the other hand, if it is determined in Step S33 that the content to be operated cannot be displayed on the operation plane (Step S33; No), the information processing device 11 transforms the coordinate system into a coordinate system based on the shape of the operation plane (in the case of the above example, the operation planes DF1 to DF4) in consideration of the shape of the operation plane (Step S34).

Subsequently, the information processing device 11 calculates the display position and the rotation correction amount of the content CN1 on the basis of the coordinate system that has been transformed into and displays the content CN1 by applying the display position and the rotation correction amount that have been calculated (Step S35) and ends the processing.

As a result, the content is matched with the shape of the display plane and is displayed in a state where each user feels less sense of incongruity.

In the above description, the case where there are two users has been described; however, even if there are three or more users, the processing is similarly performed in accordance with the orientations of all the users.

As described above, according to the second embodiment, even in a case where the same content is operated by a plurality of users, the input assist display and the input assist operation are performed in a more preferable state with less sense of incongruity for each of the plurality of users.

[3] Third Embodiment

In each of the above embodiments, a case where the display unit and the sensor unit are in a separate body from the information processing device has been described; however, the third embodiment is an embodiment in which the display unit, the sensor unit, and the information processing device are integrated.

More specifically, it is an embodiment of a case where the display unit, the sensor unit, and the information processing device are integrated into a head mounted display.

Figure 21:
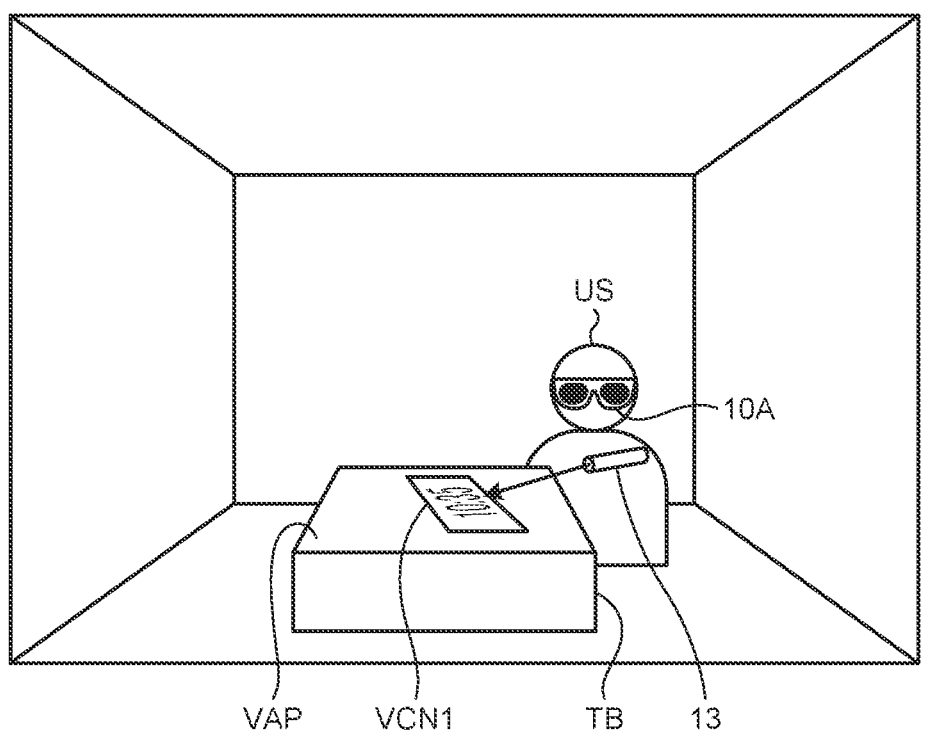
FIG. 21 is a schematic configuration explanatory diagram of a content display system according to a third embodiment.

FIG. 21 is a schematic configuration explanatory diagram of a content display system according to the third embodiment.

In FIG. 21, parts similar to those in FIG. 1 are denoted by the same symbols, and the detailed description thereof is incorporated.

A content display system 10A of the third embodiment is configured as a head mounted display that performs content display control on the basis of a state such as a posture of a user US and an instruction of the user US and causes the user US to recognize desired virtual content VCN1 as projected and displayed on the virtual projection area VAP.

Moreover, in the content display system 10A, an instruction on an input position is given in the virtual projection area VAP by an instruction input device 13.

Also in the above configuration, like in the first embodiment, the instruction input device 13 is configured as a pointing device or the like and is used for giving an instruction on an input position in the virtual projection area VAP by emitting infrared light onto the real space. The light output by the instruction input device 13 may be visible light or invisible light other than infrared light.

Figure 22:
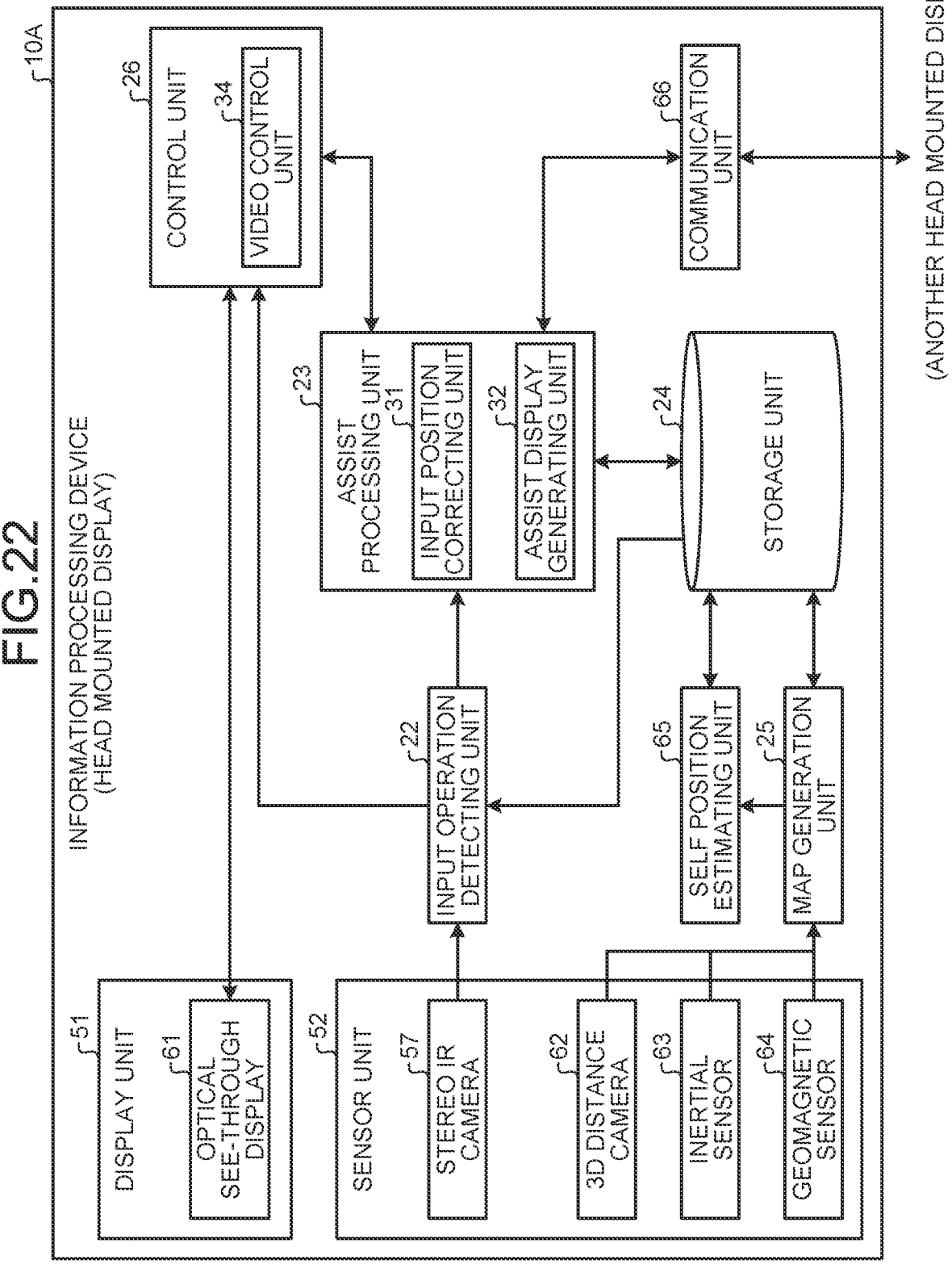
FIG. 22 is a detailed configuration block diagram of the content display system according to the third embodiment.

FIG. 22 is a detailed configuration block diagram of the content display system according to the third embodiment.

The content display system 10A includes a display unit 51, a sensor unit 52, an interface (I/F) unit 21, an input operation detecting unit 22, an assist processing unit 23, a storage unit 24, a map generation unit 25, a control unit 26, a self position estimating unit 65, and a communication unit 66.

The display unit 51 includes an optical see-through display 61 that enables the user US to visually recognize the virtual projection area VAP described above and performs display (content display on the real space) so that the virtual content VCN1 is displayed in the virtual projection area VAP set on an actual wall, the top surface of the table TB, or the like under the control of the control unit 26.

The sensor unit 52 includes a stereo IR camera 57, a 3D distance camera 62, an inertial sensor 63, and a geomagnetic sensor 64.

Here, the inertial sensor 63 and the geomagnetic sensor are used to detect the line-of-sight direction of the user US.

The stereo IR camera 57 acquires an infrared distance image used for input position detection and captures an image of an input position in the virtual projection area VAP.

The 3D distance camera 62 measures a distance to an object (wall, table TB, etc.) in the real space present at a position corresponding to the inside of the virtual projection area VAP.

The inertial sensor 63 and the geomagnetic sensor 64 estimate the posture of the content display system 10A and collect information necessary for creating a 3D map of the space and estimating the self position.

Here, as the inertial sensor 63, a three-dimensional acceleration sensor, a triaxial angular velocity sensor, or the like is used alone or in combination.

The input operation detecting unit 22 detects an input operation of the user US on the basis of input data from the stereo IR camera 57.

The communication unit 66 communicates with another information processing device (in this example, another head mounted display) and transmits and receives self position information of the operator, an input position correction result, and the like.

By adopting the above configuration, according to the third embodiment, similarly to that the content is displayed in the projector projection area AP in the first embodiment and that assist display is displayed when the user operates the content, thereby performing various types of assist operation processing, it is possible to perform virtual reality processing of operating the content in the real space by performing input position correcting processing of correcting the input position based on the operation of the instruction input device 13 at the time of operating the virtual content VCN1 displayed in the virtual projection area VAP set on an object in the real space and assist display such as displaying guide lines at the time of operating the content.

That is, in the virtual space, when the content including the UI and the like are projected and displayed on a desired area in the real space and an input operation is performed by the instruction input device 13, it is possible to implement a good input operation matching the real space by correcting the input operation position and performing assist display using information of the measured space where the content is projected, the input position information of the user, and information of the input operation target.

[4] Fourth Embodiment

The third embodiment is a case where the information processing device is configured as a head mounted display. However, the present fourth embodiment is a case where the information processing device is configured as a smartphone as a portable information processing device.

Figure 23:
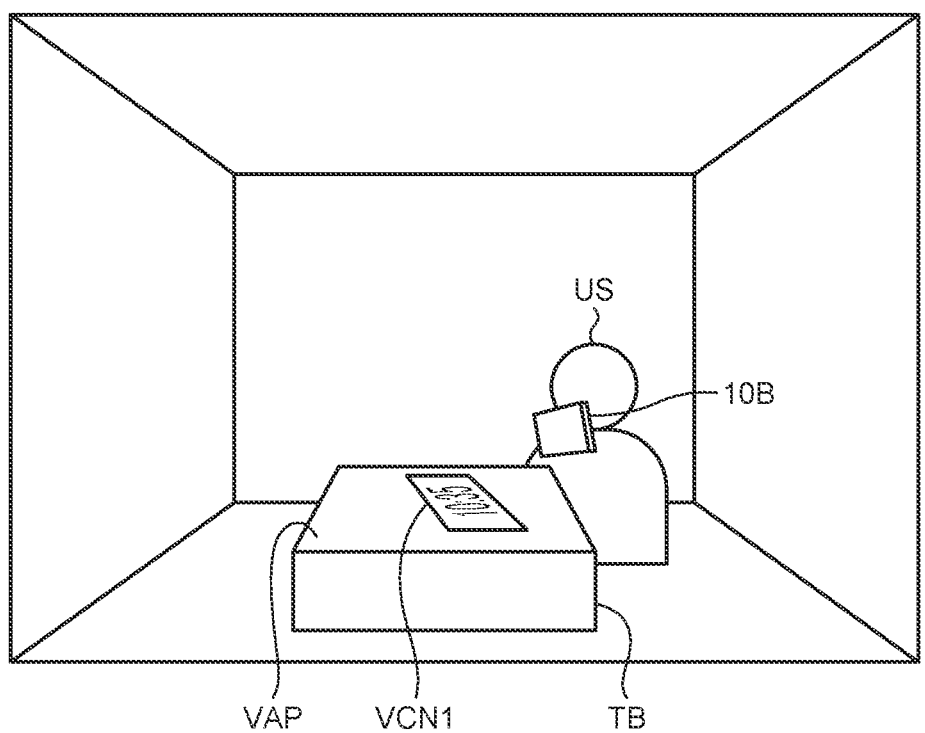
FIG. 23 is a schematic configuration explanatory diagram of a content display system according to a fourth embodiment.

FIG. 23 is a schematic configuration explanatory diagram of a content display system according to the fourth embodiment.

In FIG. 23, parts similar to those in FIG. 21 are denoted by the same symbols, and the detailed description thereof is incorporated.

Figure 24:
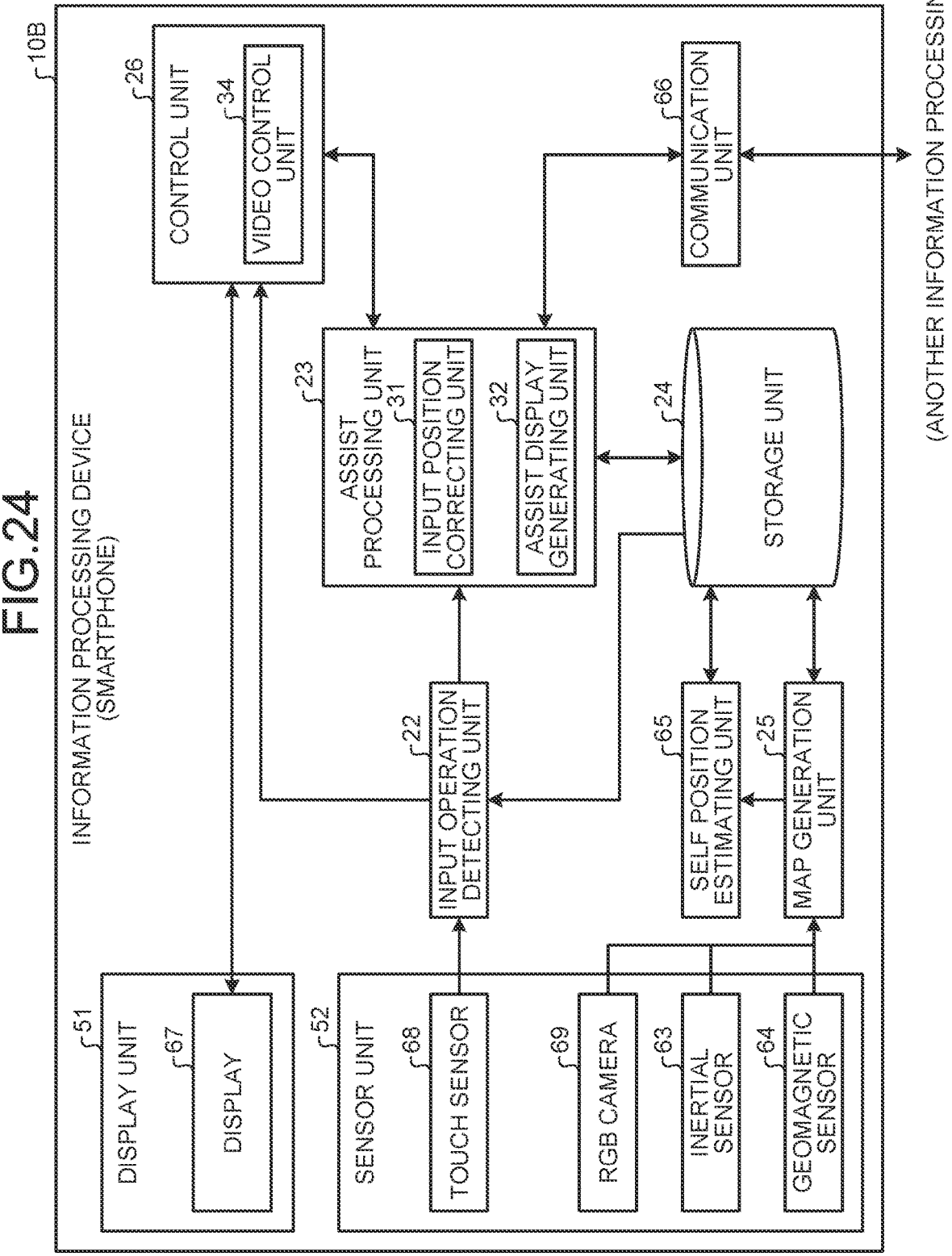
FIG. 24 is a detailed configuration block diagram of the content display system according to the fourth embodiment.

Meanwhile, FIG. 24 is a detailed configuration block diagram of the content display system according to the fourth embodiment.

Also in FIG. 24, parts similar to those in FIG. 22 are denoted by the same symbols, and the detailed description thereof is incorporated.

A content display system 10B of the fourth embodiment is configured as a smartphone that performs content display control on the basis of a state such as the posture of the content display system 10B or the orientation of a camera, and an instruction of the user US and causes the user US to recognize that desired virtual content VCN1 is projected and displayed on a virtual projection area VAP.

Moreover, in the content display system 10B, in cooperation with the display 67, an instruction on an input position is given in the virtual projection area VAP by a touch sensor 68, which will be described later, included in a so-called touch panel.

Also in the above configuration, the touch sensor 68 is configured as a pointing device and is used for giving an instruction on an input position in the virtual projection area VAP.

FIG. 22 is a detailed configuration block diagram of the content display system according to the fourth embodiment.

The content display system 10B includes a display unit 51, a sensor unit 52, an interface (I/F) unit 21, an input operation detecting unit 22, an assist processing unit 23, a storage unit 24, a map generation unit 25, a control unit 26, a self position estimating unit 65, and a communication unit 66.

The display unit 51 includes the display 67 that superimposes and displays the virtual projection area VAP in the real space imaged by the RGB camera 69, and cooperation between the RGB camera 69 and the display 67 practically implements a function similar to that of the optical see-through display 61 in the third embodiment. The display unit 51 performs display (content display on the real space) so that the virtual content VCN1 is displayed in the virtual projection area VAP set on an actual wall, a top surface of a table, or the like under the control of the control unit 26.

The sensor unit 52 includes a touch sensor 68, an RGB camera 69, an inertial sensor 63, and a geomagnetic sensor 64.

The RGB camera 69 captures an RGB visible image of the real space to be displayed on a display 67.

By adopting the above configuration, according to the fourth embodiment, like in the third embodiment, it is possible to perform the virtual reality processing of operating the content in the real space by performing the input position correcting processing of correcting the input position based on the operation of the instruction input device 13 at the time of operating the virtual content VCN1 displayed in the virtual projection area VAP set on an object in the real space and the assist display such as displaying guide lines at the time of operating the content.

That is, in the virtual space, when the content including the UI and the like are projected and displayed on a desired area in the real space and an input operation is performed by the instruction input device 13, it is possible to implement a good input operation matching the real space by correcting the input operation position and performing assist display using information of the measured space where the content is projected, the input position information of the user, and information of the input operation target.

As described above, in a case where the display coordinate system is switched from the first display coordinate system to the second display coordinate system with the display coordinate system immediately before the instruction input operation by the user deemed as the first display coordinate system and the display coordinate system corresponding to the orientation of the display content at the time of completion of the instruction input operation by the user deemed as the second display coordinate system, the display position or the display angle of the display content is changed in accordance with the second display coordinate system, and the input assist display corresponding to the axes of the second display coordinate system is displayed on the display unit such as a projector, an optical transmission type display, or a video see-through display. Therefore, a pointing input operation in a real space where there is no operation reference can be facilitated in a manner that matches the real space.

Moreover, since the second display coordinate system is set on the basis of the direction in which the user's body is directed, the direction of the line of sight, the direction of a hand, or the direction of a finger, the display position and the display angle of the display content can be changed without the sense of incongruity.

Furthermore, for setting the second display coordinate system, the display is performed so that the axes set on the basis of the orientation or the like of the text included in the display content coincide with the axes of the second display coordinate system, and thus it is possible to perform display with less discomfort for the user.

Note that the effects described herein are merely examples and are not limiting, and other effects may also be achieved.

Note that the present technology can also have the following configurations.

(1)
An information processing device comprising:
a control unit that performs:
control of switching a display coordinate system of display content from a first display coordinate system to a second display coordinate system, the display content displayed on a surface of a real object by a display unit, depending on a state of an input operation of changing a position or an angle of the display content; and
control of changing a display position or a display angle of the display content in accordance with the second display coordinate system and causing the display unit to display input assist display corresponding to axes of the second display coordinate system in a case where the display coordinate system is switched from the first display coordinate system to the second display coordinate system.

(2)
The information processing device according to (1),
wherein the input assist display includes a line along an axis of the second display coordinate system.

(3)
The information processing device according to (2),
wherein the input assist display is one of a uniaxial auxiliary line, biaxial auxiliary lines, or a frame line set in advance for the display content.

(4)
The information processing device according to (1),
wherein the control unit sets the second display coordinate system on a basis of direction information of a body of an operator performing the input operation.

(5)
The information processing device according to (4),
wherein the control unit sets the second display coordinate system on a basis of a direction in which the body of the operator performing the input operation is directed, a direction of a line of sight, a direction of a hand, or a direction of a finger of the operator performing the input operation.

(6)
The information processing device according to (1),
wherein the input operation is performed by an instruction input device, and
the control unit sets the second display coordinate system on a basis of a direction of the instruction input device.

(7)
The information processing device according to (1),
wherein the input operation is performed by an instruction input device, and
the control unit sets the second display coordinate system on a basis of a direction of a line of sight of an operator performing the input operation detected by the instruction input device.

(8)
The information processing device according to (1),
wherein the control unit sets the second display coordinate system so that an axis predetermined for the display content is included in the second display coordinate system as one axis.

(9)
The information processing device according to (8),
wherein the control unit sets the second display coordinate system to a coordinate system set in advance depending on a shape of the real object in a case where it is determined that not an entirety of a display area of the display content designated by the input operation fits within a predetermined display area.

(10)
The information processing device according to (8),
wherein the control unit sets the second display coordinate system to a coordinate system corresponding to a shape of the real object in a case where it is determined that not an entirety of a display area of the display content designated by the input operation fits within a predetermined display area.

(11)
The information processing device according to (8), wherein the control unit sets the second display coordinate system to a coordinate system based on an inclination angle of a display plane with respect to a horizontal plane when it is determined that not an entirety of the display area of the display content designated by the input operation fits within a predetermined display area.

(12)
The information processing device according to (8), wherein the control unit sets the second display coordinate system to a coordinate system based on a coordinate system of the display unit in a case where it is determined that not an entirety of the display area of the display content designated by the input operation fits within a predetermined display area.

(13)
The information processing device according to (1), wherein the control unit changes the display position or the display angle of the display content in accordance with the second display coordinate system that has been set so that the display content falls within a display area of the display content in a case where it is determined that the display area does not fall within a predetermined display area when the display coordinate system of the display content is switched from the first display coordinate system to the second display coordinate system depending on a state of the input operation.

(14)
The information processing device according to (1), wherein the control unit has a pointing mode and a free-drawing mode as operation modes corresponding to a state of the input operation and prohibits changing the display coordinate system in the free-drawing mode.

(15)
The information processing device according to (1), wherein, in a case where there is a plurality of operators who are performing the input operation, in a case where a difference in display directions of the display content after operations by the plurality of operators, corresponding to states of the input operations corresponding to the plurality of operators, is within a predetermined angle range, the control unit sets a direction in a middle of the display directions of the plurality of operators as a direction in which the second display coordinate system is directed and, in a case where a difference in display directions of the display content deviates the predetermined angle range, the control unit sets the direction in which the second display coordinate system is directed by giving a priority to an operation of an operator who has performed the input operation first among the plurality of operators.

(16)
The information processing device according to (1), wherein the control unit performs the input assist display corresponding to the first display coordinate system in a case where the input assist display is performed before the display coordinate system is switched from the first display coordinate system to the second display coordinate system.

(17)
The information processing device according to (1), wherein the control unit starts the input assist display corresponding to the second display coordinate system when a change in the position or the angle exceeds a threshold value after the position or the angle has been input by the input operation.

(18)
The information processing device according to (1), wherein the control unit ends the input assist display corresponding to the second display coordinate system in a case where the input operation is completed or in a case where there has been no change in the position or the angle by the input operation for a predetermined period of time.

(19)
The information processing device according to (1), wherein the display unit is configured as a projector, an optical transmission type display, or a video see-through display.

(20)
A method executed by an information processing device that performs control to display content on a display unit, the method comprising:
a process of switching a display coordinate system of display content from a first display coordinate system to a second display coordinate system, the display content displayed on a surface of a real object by a display unit, depending on a state of an input operation of changing a position or an angle of the display content; and
a process of changing a display position or a display angle of the display content in accordance with the second display coordinate system and causing the display unit to display input assist display corresponding to axes of the second display coordinate system in a case where the display coordinate system is switched from the first display coordinate system to the second display coordinate system.

(21)
The method according to (20),
in which the input assist display includes a line along an axis of the second display coordinate system.

(22)
The method according to (20),
in which the input assist display is one of a uniaxial auxiliary line, biaxial auxiliary lines, or a frame line set in advance for the display content.

(23)
The method according to (20),
in which the second display coordinate system is set on a basis of direction information regarding a body of an operator performing the input operation.

(24)
The method according to (20),
in which the second display coordinate system is set on a basis of a direction in which the body of the operator performing the input operation is directed, a direction of a line of sight, a direction of a hand, or a direction of a finger of the operator performing the input operation.

(25)
The method according to (20),
in which the input operation is performed by an instruction input device, and
the second display coordinate system is set on a basis of a direction of the instruction input device.

(26)
The method according to (20),
in which the input operation is performed by an instruction input device, and the second display coordinate system is set on a basis of a direction of a line of sight of an operator performing the input operation detected by the instruction input device.

(27)

The method according to (20), in which the second display coordinate system is set so that an axis predetermined for the display content is included in the second display coordinate system as one axis.

(28)

The method according to (27), in which the second display coordinate system is set to a coordinate system set in advance depending on a shape of the real object in a case where it is determined that not an entirety of a display area of the display content designated by the input operation fits within a predetermined display area.

(29)

The method according to (27), in which the second display coordinate system is set to a coordinate system corresponding to a shape of the real object in a case where it is determined that not an entirety of a display area of the display content designated by the input operation fits within a predetermined display area.

(30)

The method according to (27), in which the second display coordinate system is set to a coordinate system based on an inclination angle of a display plane with respect to a horizontal plane when it is determined that not an entirety of the display area of the display content designated by the input operation fits within a predetermined display area.

(31)

The method according to (27), in which the second display coordinate system is set to a coordinate system based on a coordinate system of the display unit in a case where it is determined that not an entirety of the display area of the display content designated by the input operation fits within a predetermined display area.

(32)

The method according to (20), in which the display position or the display angle of the display content is changed in accordance with the second display coordinate system that has been set so that the display content falls within a display area of the display content in a case where it is determined that the display area does not fall within the predetermined display area when the display coordinate system of the display content is switched from the first display coordinate system to the second display coordinate system depending on a state of the input operation.

(33)

The method according to (20), in which there are a pointing mode and a free-drawing mode as operation modes corresponding to a state of the input operation, and changing the display coordinate system in the free-drawing mode is prohibited.

(34)

The method according to (20), in which, in a case where there is a plurality of operators who are performing the input operation, in a case where a difference in display directions of the display content after operations by the plurality of operators, corresponding to states of the input operations corresponding to the plurality of operators, is within a predetermined angle range, the control unit sets a direction in a middle of the display directions of the plurality of operators as a direction in which the second display coordinate system is directed and, in a case where a difference in display directions of the display content deviates the predetermined angle range, the control unit sets the direction in which the second display coordinate system is directed by giving a priority to an operation of an operator who has performed the input operation first among the plurality of operators.

(35)

The method according to (20), in which the input assist display corresponding to the first display coordinate system is performed in a case where the input assist display is performed before the display coordinate system is switched from the first display coordinate system to the second display coordinate system.

(36)

The method according to (20), in which the input assist display corresponding to the second display coordinate system is started when a change in the position or the angle exceeds a threshold value after the position or the angle has been input by the input operation.

(37)

The method according to (20), in which the control unit ends the input assist display corresponding to the second display coordinate system in a case where the input operation is completed or in a case where there has been no change in the position or the angle by the input operation for a predetermined period of time.

(38)

A program for controlling, by a computer, an information processing device that performs control to display content on a display unit, the program causing the computer to function as:

a means for switching a display coordinate system of display content from a first display coordinate system to a second display coordinate system, the display content displayed on a surface of a real object by a display unit, depending on a state of an input operation of changing a position or an angle of the display content; and a means for changing a display position or a display angle of the display content in accordance with the second display coordinate system and causing the display unit to display input assist display corresponding to axes of the second display coordinate system in a case where the display coordinate system is switched from the first display coordinate system to the second display coordinate system.

(39)

The program according to (38), in which the computer is caused to function as a means to display, as the input assist display, including a line along an axis of the second display coordinate system.

(40)

The program according to (38), in which the computer is caused to function as a means for displaying, as the input assist display, any one of a uniaxial auxiliary line, biaxial auxiliary lines, and a frame line set in advance for the display content.

(41)
The program according to (38),
in which the computer is caused to function as a means for setting the second display coordinate system on a basis of direction information regarding a body of an operator performing the input operation.

(42)
The program according to (38),
in which the computer is caused to function as a means for setting the second display coordinate system on a basis of a direction in which a body of an operator performing the input operation is directed, a direction of a line of sight, a direction of a hand, or a direction of a finger of the operator performing the input operation.

(43)
The program according to (38),
in which the input operation is performed by an instruction input device, and
the computer is caused to function as a means for setting the second display coordinate system on a basis of a direction of the instruction input device.

(44)
The program according to (38),
in which the input operation is performed by an instruction input device, and
the computer is caused to function as a means for setting the second display coordinate system on a basis of a direction of a line of sight of an operator performing the input operation detected by the instruction input device.

(45)
The program according to (38),
in which the computer is caused to function as a means for setting the second display coordinate system so that an axis predetermined for the display content is included in the second display coordinate system as one axis.

(46)
The program according to (45),
in which the computer is caused to function as a means for setting the second display coordinate system to a coordinate system set in advance depending on a shape of the real object in a case where it is determined that not an entirety of a display area of the display content designated by the input operation fits within a predetermined display area.

(47)
The program according to (45),
in which the computer is caused to function as a means for setting the second display coordinate system to a coordinate system corresponding to a shape of the real object in a case where it is determined that not an entirety of a display area of the display content designated by the input operation fits within a predetermined display area.

(48)
The program according to (45),
in which the computer is caused to function as a means for setting the second display coordinate system to a coordinate system based on an inclination angle of a display plane with respect to a horizontal plane when it is determined that not an entirety of the display area of the display content designated by the input operation fits within a predetermined display area.

(49)
The program according to (45),
in which the computer is caused to function as a means for setting the second display coordinate system to a coordinate system based on a coordinate system of the display unit in a case where it is determined that not an entirety of the display area of the display content designated by the input operation fits within a predetermined display area.

(50)
The program according to (38),
in which the computer is caused to function as a means for changing the display position or the display angle of the display content in accordance with the second display coordinate system that has been set so that the display content falls within a display area of the display content in a case where it is determined that the display area does not fall within the predetermined display area when the display coordinate system of the display content is switched from the first display coordinate system to the second display coordinate system depending on a state of the input operation.

(51)
The program according to (38),
in which there are a pointing mode and a free-drawing mode as operation modes corresponding to a state of the input operation, and
the computer is caused to function as a means for prohibiting a change of the display coordinate system in the free-drawing mode.

(52)
The program according to (38),
in which the computer is caused to function as a means for, in a case where there is a plurality of operators who are performing the input operation, in a case where a difference in display directions of the display content after operations by the plurality of operators, corresponding to states of the input operations corresponding to the plurality of operators, is within a predetermined angle range, setting a direction in a middle of the display directions of the plurality of operators as a direction in which the second display coordinate system is directed and, in a case where a difference in display directions of the display content deviates the predetermined angle range, setting the direction in which the second display coordinate system is directed by giving a priority to an operation of an operator who has performed the input operation first among the plurality of operators.

(53)
The program according to (38),
in which the computer is caused to function as a means for performing the input assist display corresponding to the first display coordinate system in a case where the input assist display is performed before the display coordinate system is switched from the first display coordinate system to the second display coordinate system.

(54)
The program according to (38),
in which the computer is caused to function as a means for starting the input assist display corresponding to the second display coordinate system when a change in the position or the angle exceeds a threshold value after the position or the angle has been input by the input operation.

(55)
The program according to (38),
in which the computer is caused to function as a means for ending the input assist display corresponding to the second display coordinate system in a case where the input operation is completed or in a case where there has been no change in the position or the angle by the input operation for a predetermined period of time.

REFERENCE SIGNS LIST 10, 10A, 10B CONTENT DISPLAY SYSTEM
11 INFORMATION PROCESSING DEVICE
12 CONTENT PROJECTION UNIT
13 INSTRUCTION INPUT DEVICE
21 INTERFACE UNIT
22 INPUT OPERATION DETECTING UNIT
23 ASSIST PROCESSING UNIT
24 STORAGE UNIT
25 MAP GENERATION UNIT
26 CONTROL UNIT
31 INPUT POSITION CORRECTING UNIT
32 ASSIST DISPLAY GENERATING UNIT
33 DRIVE CONTROL UNIT
34 VIDEO CONTROL UNIT
41 DRIVEN UNIT
42 DRIVING UNIT
51 DISPLAY UNIT
52 SENSOR UNIT
55 PROJECTOR
56 DEPTH SENSOR
57 STEREO IR CAMERA
58 OVERHEAD CAMERA
59 MOTOR
61 OPTICAL SEE-THROUGH DISPLAY
62 3D DISTANCE CAMERA
63 INERTIAL SENSOR
64 GEOMAGNETIC SENSOR
65 SELF POSITION ESTIMATING UNIT
66 COMMUNICATION UNIT
67 DISPLAY
68 TOUCH SENSOR
69 RGB CAMERA
AP, AP1, AP2 PROJECTOR PROJECTION AREA
CD1 to CD3, CD41 to CD44 COORDINATE SYSTEM
CN1, CN2 CONTENT (DISPLAY CONTENT)
CN3 ADDITIONAL CONTENT
CN4 GRAPHIC CONTENT
DF1 to DF4 DISPLAY PLANE
GF GUIDE FRAME
GL1 GUIDE LINE (FIRST DISPLAY COORDINATE SYSTEM)
GL2 GUIDE LINE (SECOND DISPLAY COORDINATE SYSTEM)
US USER
US1 FIRST USER
US2 SECOND USER
VAP VIRTUAL PROJECTION AREA
VCN1 VIRTUAL CONTENT

The invention claimed is:

1. An information processing device, comprising:
circuitry configured to:
control a display unit to display content on a surface of a real object;
determine, based on a state of an input operation indicating a change of at least one of a position of the displayed content or an angle of the displayed content, a portion of a display area of the displayed content is outside a specific display area;
switch, based on the determination that the portion of the display area of the displayed content is outside the specific display area, display coordinate system of the displayed content from a first display coordinate system to a second display coordinate system, wherein in the second display coordinate system, the display area of the displayed content is within the specific display area;
change, based on the switched second display coordinate system, at least one of a display position of the displayed content or a display angle of the displayed content; and
control the display unit to display an input assist display corresponding to axes of the switched second display coordinate system, wherein the display unit is controlled to display the input assist display in a case where the display coordinate system of the displayed content is switched from the first display coordinate system to the second display coordinate system.

2. The information processing device according to claim 1, wherein the input assist display includes a line along an axis of the second display coordinate system.

3. The information processing device according to claim 2, wherein the input assist display is one of a uniaxial auxiliary line, biaxial auxiliary lines, or a frame line set in advance for the displayed content.

4. The information processing device according to claim 1, wherein
the circuitry is further configured to set the second display coordinate system based on direction information of a body of an operator, and
the input operation is performed by the operator.

5. The information processing device according to claim 4, wherein the circuitry is further configured to set the second display coordinate system based on at least one:
a direction in which the body of the operator is directed,
a direction of a line of sight of the operator,
a direction of a hand of the operator, or
a direction of a finger of the operator.

6. The information processing device according to claim 1, wherein
the input operation is performed by an instruction input device, and
the circuitry is further configured to set the second display coordinate system based on a direction of the instruction input device.

7. The information processing device according to claim 1, wherein
the input operation is performed by an instruction input device,
the circuitry is further configured to set the second display coordinate system based on a direction of a line of sight of an operator, and
the input operation is performed by the operator using the instruction input device.

8. The information processing device according to claim 1, wherein the circuitry is further configured to set the second display coordinate system so that an axis for the displayed content is included in the second display coordinate system as one axis.

9. The information processing device according to claim 8, wherein
the circuitry is further configured to set, based on the determination that the portion of the display area of the displayed content is outside the specific display area, the second display coordinate system to a third coordinate system, and
the third coordinate system is set based on a shape of the real object.

10. The information processing device according to claim 8, wherein
the circuitry is further configured to set, based on the determination that the portion of the display area of the displayed content is outside the specific display area, the second display coordinate system to a third coordinate system corresponding to a shape of the real object.

11. The information processing device according to claim 8, wherein
the circuitry is further configured to set, based on the determination that the portion of the display area of the displayed content is outside the specific display area, the second display coordinate system to a third coordinate system, and
the third coordinate system is set based on an inclination angle of a display plane with respect to a horizontal plane.

12. The information processing device according to claim 8, wherein
the circuitry is further configured to set, based on the determination that the portion of the display area of the displayed content is outside the specific display area, the second display coordinate system to a third coordinate system, and
the third coordinate system is set based on a coordinate system of the display unit.

13. The information processing device according to claim 1, wherein
the circuitry has a pointing mode and a free-drawing mode as operation modes corresponding to the state of the input operation, and
the circuitry is further configured to prohibit a change of the display coordinate system in the free-drawing mode.

14. The information processing device according to claim 1, wherein,
in a case where a plurality of input operations is performed by a plurality of operators and a difference in display directions of the displayed content after the plurality of input operations by the plurality of operators, corresponding to states of the plurality of input operations corresponding to the plurality of operators, is within a specific angle range, the circuitry is further configured to set a direction in a middle of the display directions of the plurality of operators as a direction in which the second display coordinate system is directed,
the plurality of input operations includes the input operation, and
in a case where the difference in the display directions of the displayed content deviates the specific angle range, the circuitry is further configured to set the direction in which the second display coordinate system is directed by giving a priority to an operation of an operator who performed the input operation first among the plurality of operators.

15. The information processing device according to claim 1, wherein the circuitry is further configured to control the display unit to display the input assist display corresponding to the first display coordinate system in a case where the input assist display is displayed before the switch of the display coordinate system from the first display coordinate system to the second display coordinate system.

16. The information processing device according to claim 1, wherein the circuitry is further configured to control the display unit to start a display of the input assist display corresponding to the second display coordinate system in a case where a change in the at least one of the position or the angle exceeds a threshold value.

17. The information processing device according to claim 1, wherein the circuitry is further configured to control the display unit to end a display of the input assist display corresponding to the second display coordinate system in a case where the input operation is completed or in a case where the at least one of the position or the angle is unchanged a specific period of time.

18. The information processing device according to claim 1, wherein the display unit is configured as one of a projector, an optical transmission type display, or a video see-through display.

19. A method executed by an information processing device, the method comprising:
controlling a display unit to display content on a surface of a real object;
determining, based on a state of an input operation indicating a change of at least one of a position of the displayed content or an angle of the displayed content, a portion of a display area of the displayed content is outside a specific display area;
switching, based on the determination that the portion of the display area of the displayed content is outside the specific display area, a display coordinate system of the displayed content from a first display coordinate system to a second display coordinate system, wherein in the second display coordinate system, the display area of the displayed content is within the specific display area;
changing, based on the switched second display coordinate system, at least one of a display position of the displayed content or a display angle of the displayed content; and
controlling the display unit to display an input assist display corresponding to axes of the switched second display coordinate system, wherein the display unit is controlled to display the input assist display in a case where the display coordinate system of the displayed content is switched from the first display coordinate system to the second display coordinate system.

20. A non-transitory computer-readable medium having stored thereon, computer-executable instructions which, when executed by a computer, cause the computer to execute operations, the operations comprising:
controlling a display unit to display content on a surface of a real object;
determining, based on a state of an input operation indicating a change of at least one of a position of the displayed content or an angle of the displayed content, a portion of a display area of the displayed content is outside a specific display area;
switching, based on the determination that the portion of the display area of the displayed content is outside the specific display area, a display coordinate system of the displayed content from a first display coordinate system to a second display coordinate system, wherein in the second display coordinate system, the display area of the displayed content is within the specific display area;
changing, based on the switched second display coordinate system, at least one of a display position of the displayed content or a display angle of the displayed content; and controlling the display unit to display an input assist display corresponding to axes of the switched second display coordinate system, wherein the display unit is controlled to display the input assist display in a case where the display coordinate system of the displayed content is switched from the first display coordinate system to the second display coordinate system.

\* \* \* \* \*